US009864125B2

(12) United States Patent
Gierens et al.

(10) Patent No.: US 9,864,125 B2
(45) Date of Patent: Jan. 9, 2018

(54) ILLUMINATED LIGHT GUIDE ASSEMBLY

(71) Applicant: SAINT-GOBAIN GLASS FRANCE, Courbevoie (FR)

(72) Inventors: Anne Gierens, Dusseldorf (DE); Richard Wolff, Pronleroy (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/323,647

(22) PCT Filed: Jul. 2, 2015

(86) PCT No.: PCT/FR2015/051836
§ 371 (c)(1),
(2) Date: Jan. 3, 2017

(87) PCT Pub. No.: WO2016/001597
PCT Pub. Date: Jan. 7, 2016

(65) Prior Publication Data
US 2017/0139109 A1   May 18, 2017

(30) Foreign Application Priority Data
Jul. 3, 2014  (FR) ..................... 14 56379

(51) Int. Cl.
*G09F 13/18*   (2006.01)
*G02B 6/00*    (2006.01)
(Continued)

(52) U.S. Cl.
CPC ...... *G02B 6/0043* (2013.01); *B32B 17/10055* (2013.01); *B32B 17/10541* (2013.01);
(Continued)

(58) Field of Classification Search
CPC ............. G09F 13/18; G09F 2013/1831; G09F 2013/222; G02B 6/0011; G02B 6/0035; F21V 2200/20
See application file for complete search history.

(56) References Cited

U.S. PATENT DOCUMENTS 2,623,313 A * 12/1952 Fuchs .................. G02B 6/0031
  340/815.42
3,591,941 A *  7/1971 Jaffe, Jr. ................. F21V 23/00
  40/546
(Continued)

FOREIGN PATENT DOCUMENTS

DE   102 06 613 A1   8/2003
EP   1 329 433 A1    7/2003
(Continued)

OTHER PUBLICATIONS

International Preliminary Report on Patentability and then Written Opinion of the International Searching Authority as issued in International Patent Application No. PCT/FR2015/051836, dated Jan. 3, 2017.
(Continued)

*Primary Examiner* — Ismael Negron
(74) *Attorney, Agent, or Firm* — Pillsbury Winthrop Shaw Pittman LLP

(57)   ABSTRACT

An illuminated light guide assembly includes a first light guide panel coupled to a first light source; a first light-extracting system on the first light guide panel; a second light guide panel coupled to a second light source different from the first light source; a second light-extracting system offset from the first extracting system; and a first optical isolator coupled to the first light guide panel with a first lamination interlayer and coupled to the second light guide panel with a second lamination interlayer.

23 Claims, 11 Drawing Sheets

(51) Int. Cl.
  *F21V 8/00* (2006.01)
  *B32B 17/10* (2006.01)
(52) U.S. Cl.
  CPC ...... *B32B 17/10761* (2013.01); *G02B 6/0035* (2013.01); *G02B 6/0076* (2013.01); *B32B 2255/00* (2013.01); *B32B 2307/412* (2013.01); *B32B 2307/418* (2013.01); *B32B 2315/08* (2013.01); *B32B 2323/04* (2013.01); *B32B 2551/00* (2013.01)

(56) References Cited

U.S. PATENT DOCUMENTS

| | | | | |
|---|---|---|---|---|
| 5,027,258 A | * | 6/1991 | Schoniger | G02B 6/0023 362/629 |
| 5,075,826 A | * | 12/1991 | Lan | B60Q 1/302 362/23.16 |
| 5,276,591 A | * | 1/1994 | Hegarty | G02B 6/0036 362/2 |
| 5,390,436 A | * | 2/1995 | Ashall | G02B 6/0043 362/618 |
| 5,572,818 A | * | 11/1996 | Churchill | G02B 6/06 362/23.15 |
| 5,678,334 A | * | 10/1997 | Schoniger | G02B 6/0051 40/446 |
| 6,174,065 B1 | * | 1/2001 | Schurch | G02B 6/0008 362/125 |
| 6,308,444 B1 | * | 10/2001 | Ki | G09F 13/18 362/293 |
| 6,471,388 B1 | * | 10/2002 | Marsh | G02B 6/0031 313/318.11 |
| 9,500,354 B2 | * | 11/2016 | Gierens | E06B 3/66 |
| 2004/0040228 A1 | | 3/2004 | Emde et al. | |
| 2011/0047840 A1 | * | 3/2011 | Ou | G02B 6/006 40/546 |

FOREIGN PATENT DOCUMENTS

| | | |
|---|---|---|
| EP | 2 423 173 A1 | 2/2012 |
| FR | 2 694 069 A1 | 1/1994 |
| FR | 2 976 343 A1 | 12/2012 |
| FR | 2 982 196 A1 | 5/2013 |
| JP | H10-124710 A | 5/1998 |
| JP | 2007-328810 A | 12/2007 |
| WO | WO 01/90787 A1 | 11/2001 |
| WO | WO 2008/059170 A2 | 5/2008 |
| WO | WO 2012/028820 A1 | 3/2012 |

OTHER PUBLICATIONS

International Search Report as issued in International Patent Application No. PCT/FR2015/051836, dated Oct. 15, 2015.

\* cited by examiner

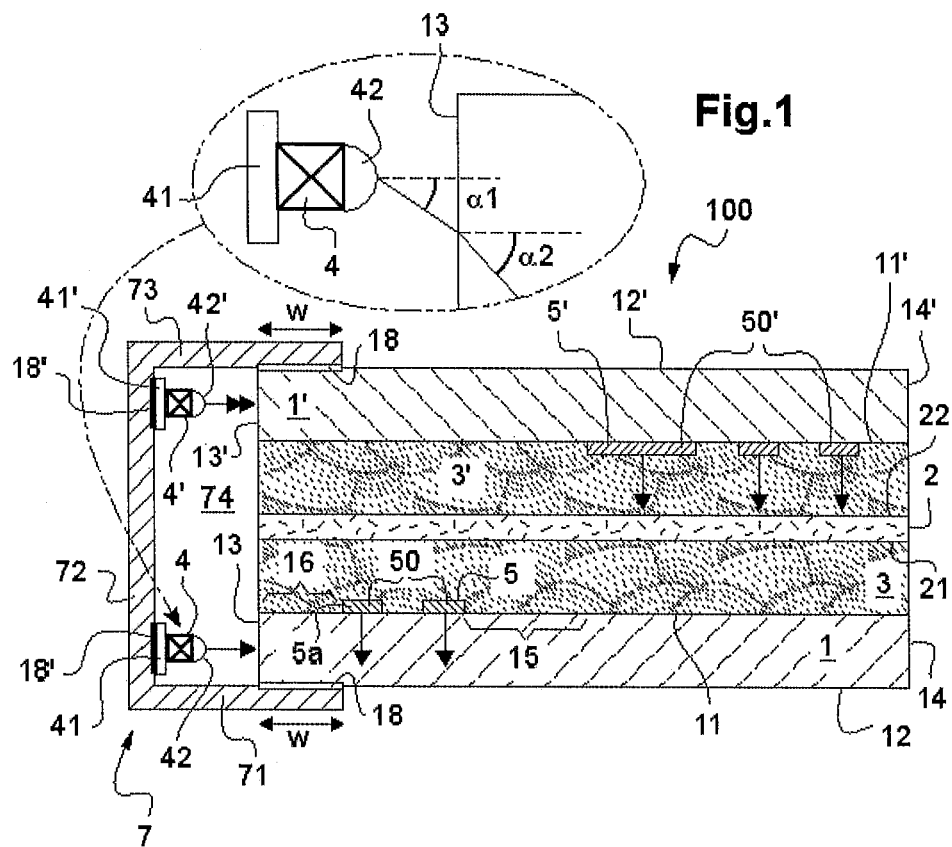
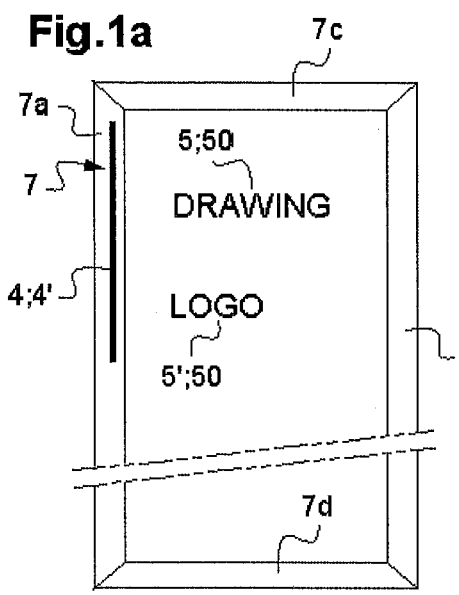
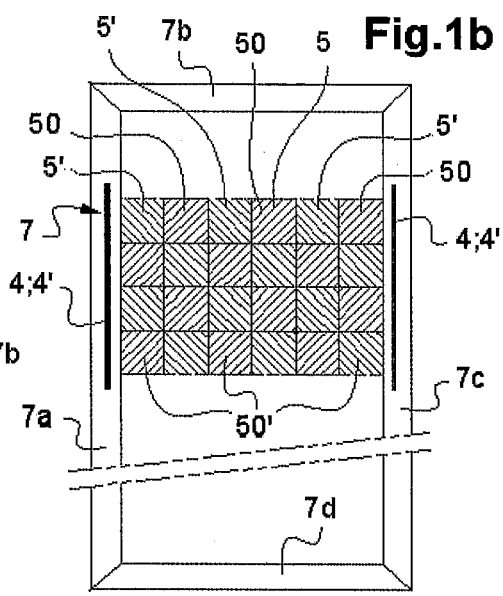

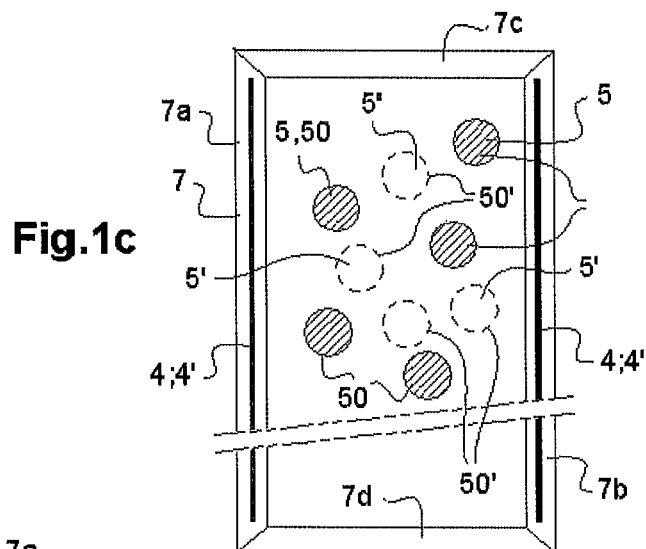
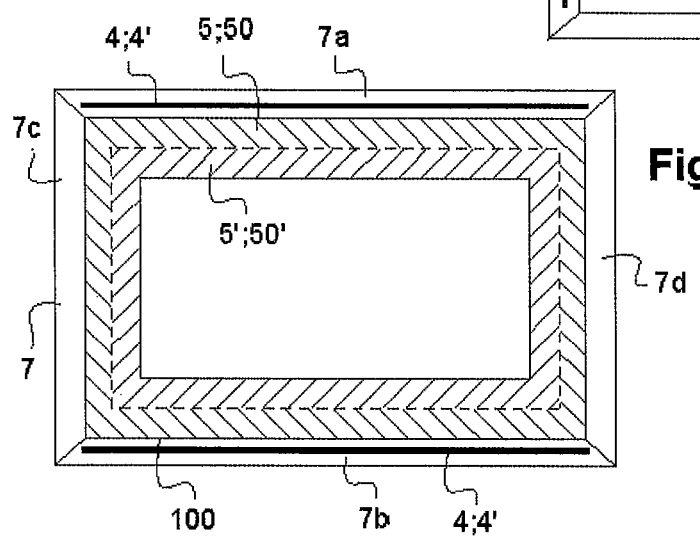
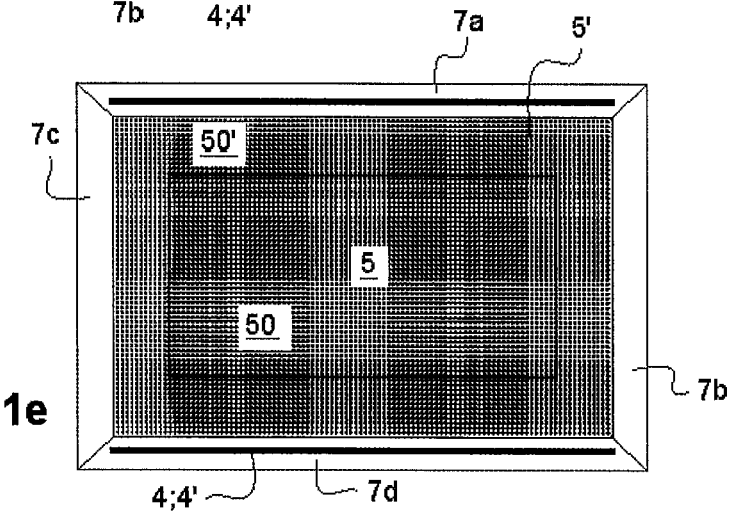

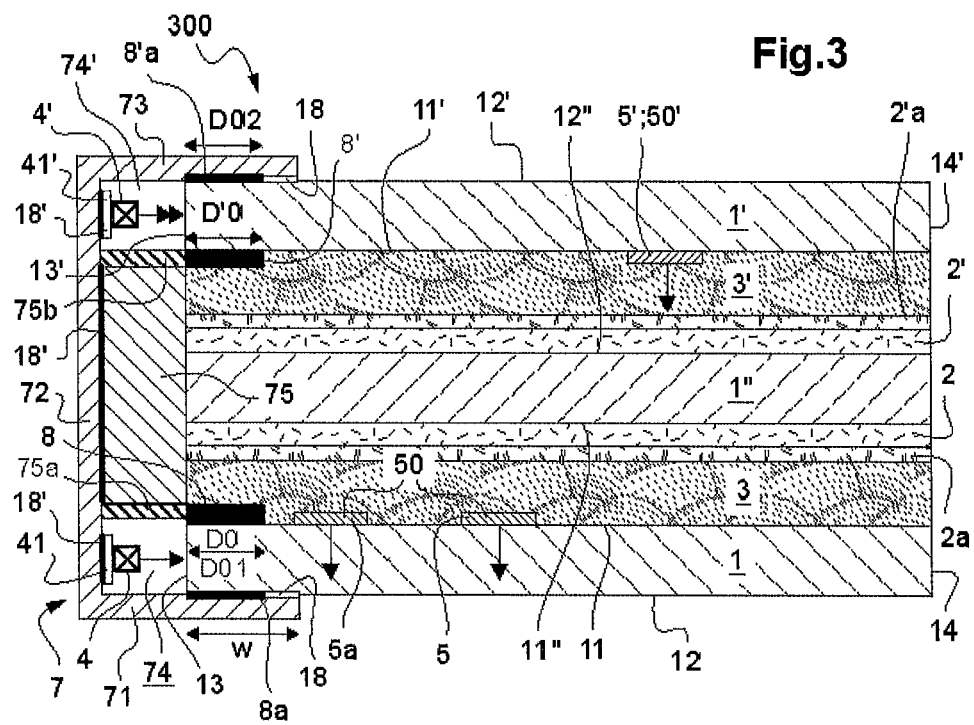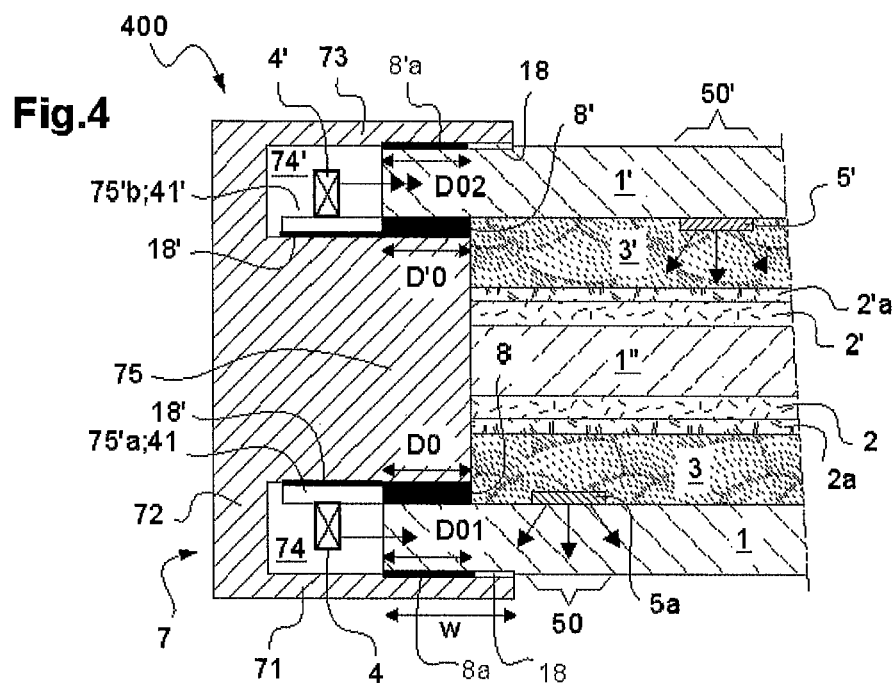

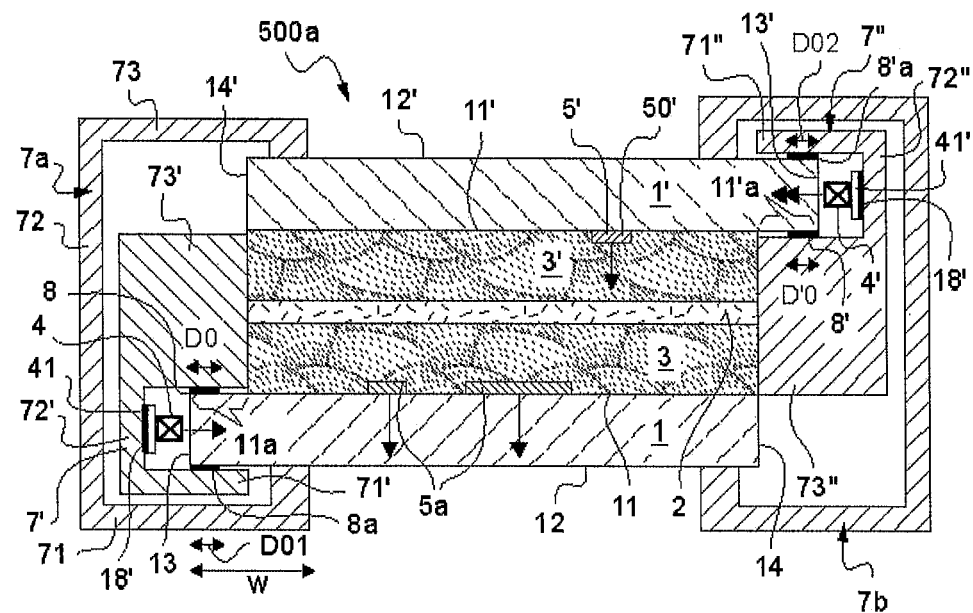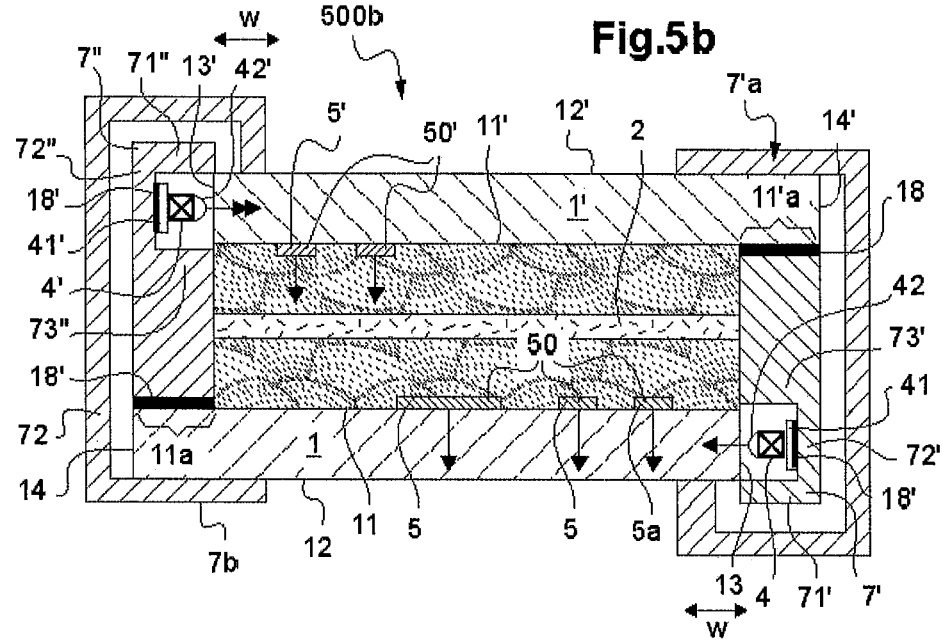

Fig.5'a

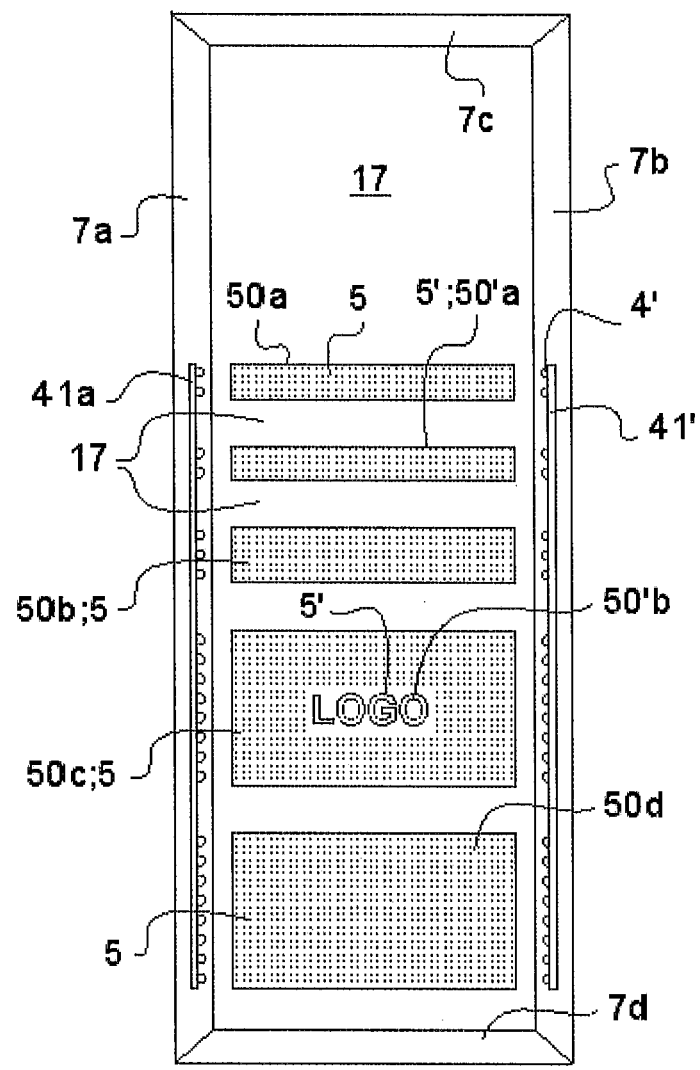

Figure 1:
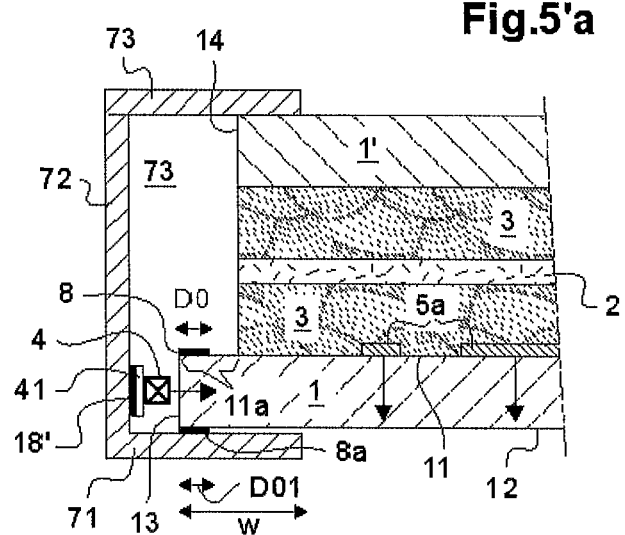
Figure 1:
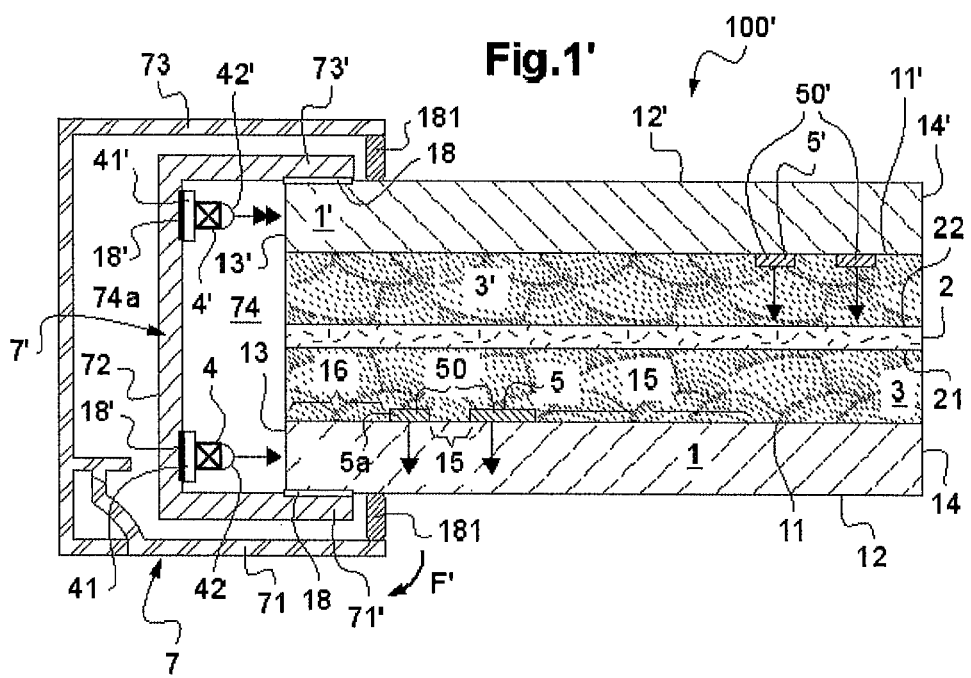

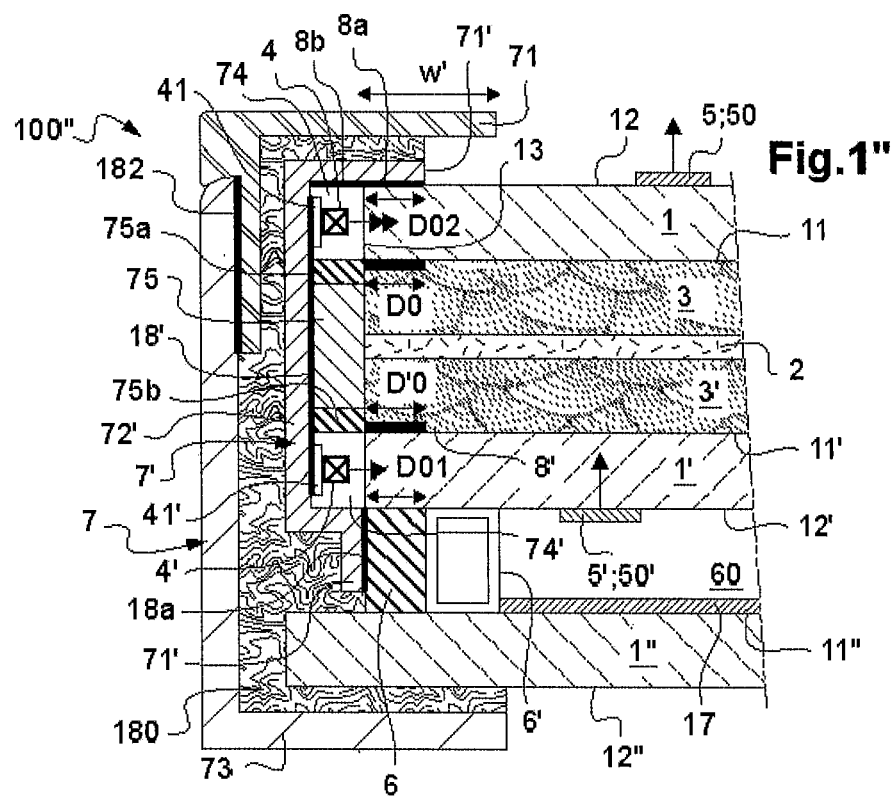
Fig.1"
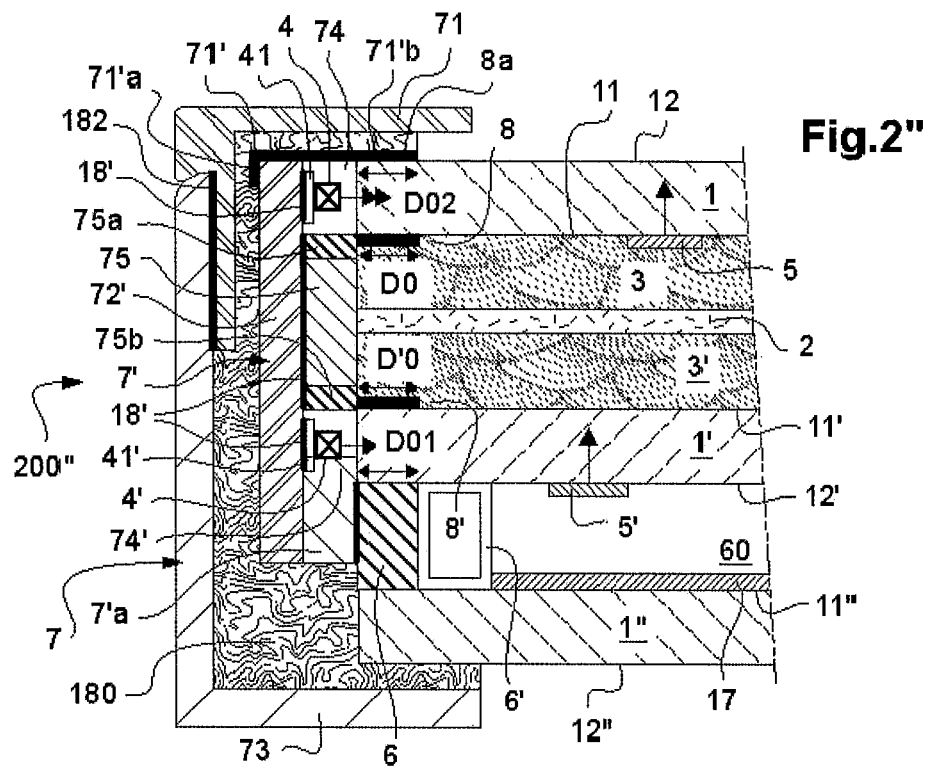
Fig.2"

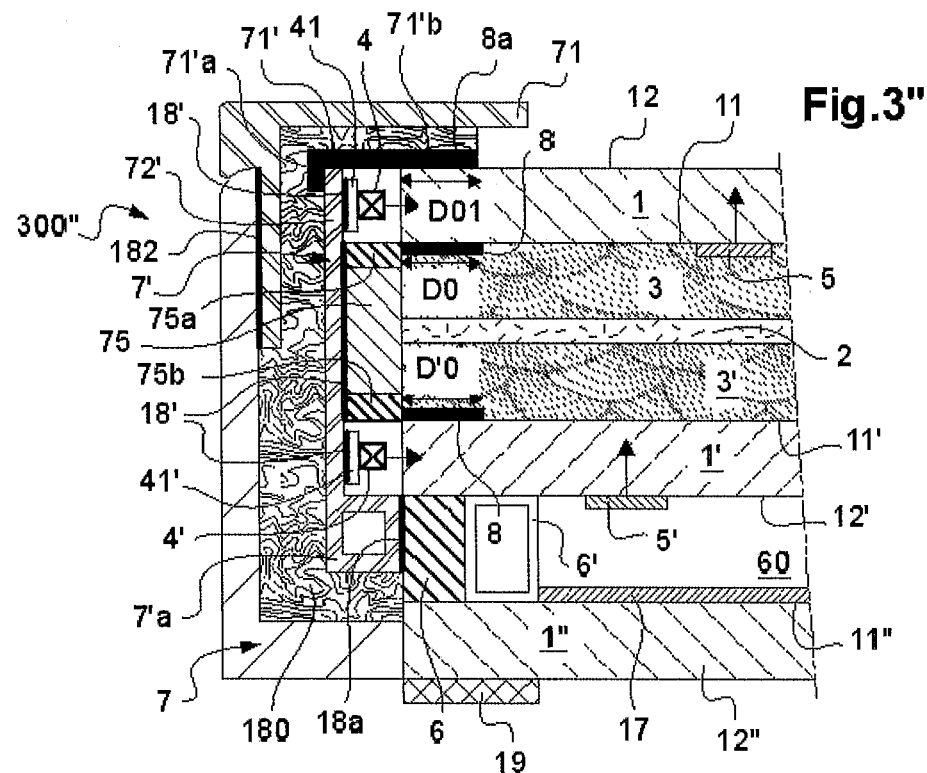
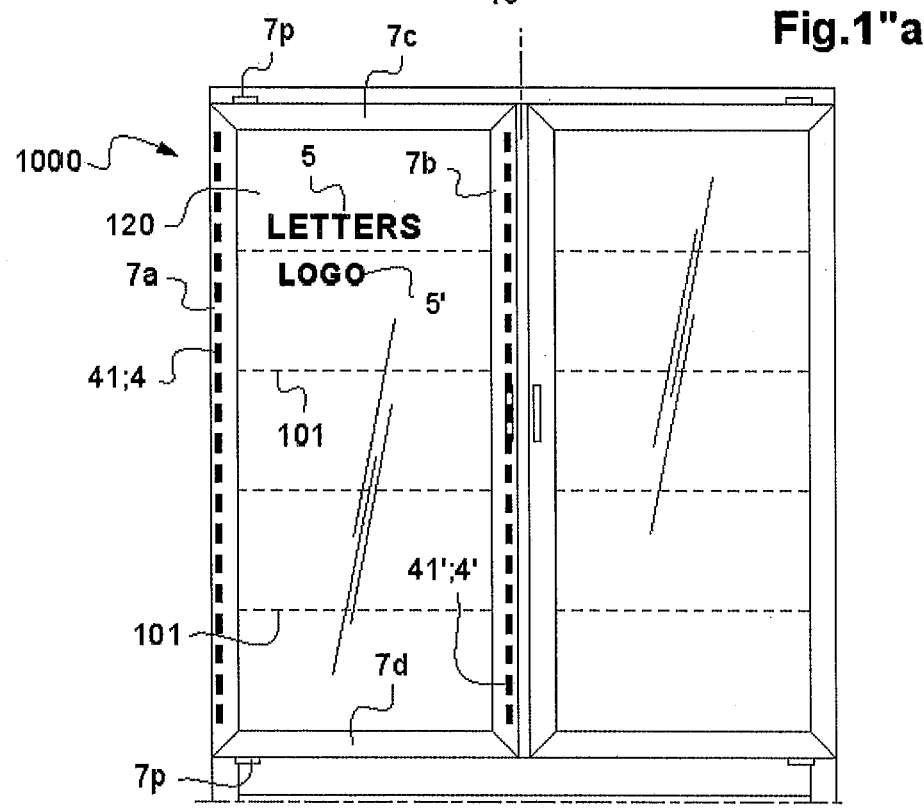

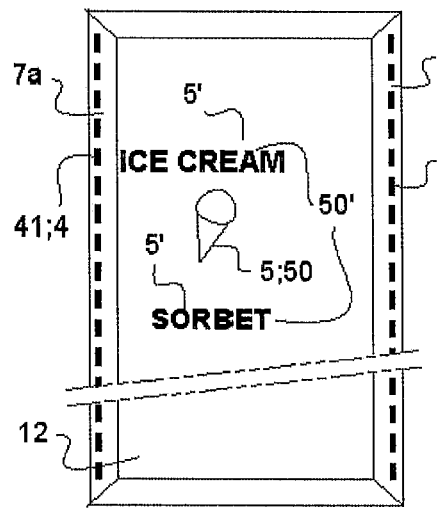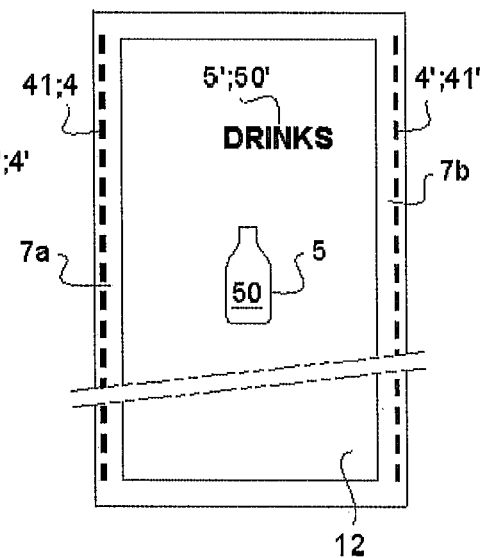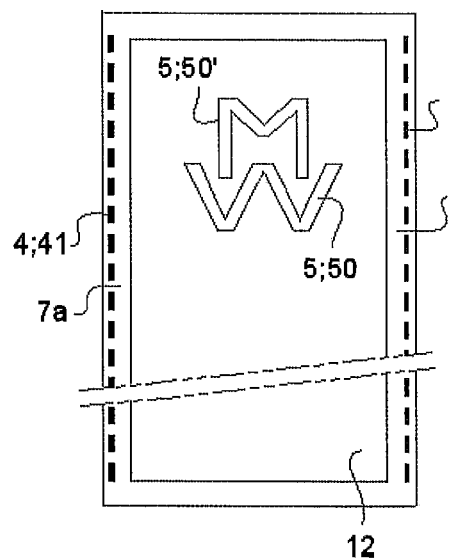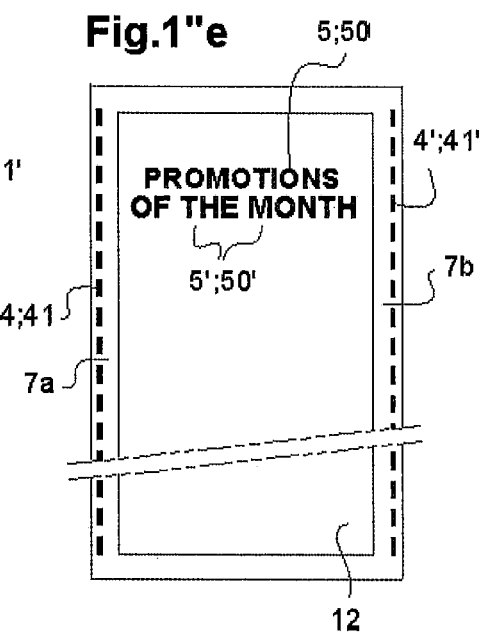

ILLUMINATED LIGHT GUIDE ASSEMBLY

CROSS-REFERENCE TO RELATED APPLICATIONS

This application is the U.S. National Stage of International Application Serial No. PCT/FR2015/051836, filed Jul. 2, 2015, which in turn claims priority to French Application No. 1456379, filed Jul. 3, 2014. The contents of all of these applications are incorporated herein by reference in their entirety.

The present invention relates to the field of lighting and more particularly relates to a glazing assembly made luminous by extracting light guided in a glass sheet.

It is known to form a luminous glazing unit by illuminating a glass sheet via the edge face with a light source such as an assembly of light-emitting diodes. The light thus injected is guided by total internal reflection inside this glass sheet by virtue of the contrast in refractive index with the surrounding materials. This light is then extracted using means for forming a signal, which are conventionally a scattering layer.

Naturally, the diodes may be controlled to produce, via the scattering feature, a continuous or flashing luminous region that may even change color.

The Applicant proposes to widen the range of available luminous glazing units based on a light-guiding glass sheet illuminated via the edge face, while making it possible to see simultaneously a first luminous region of a first color, visible from a first side of the glazing unit, and a second luminous region of a second different color, also visible from this first side of the glazing unit, with design freedom as regards the size and distribution of these first and second luminous zones.

For this purpose, one subject of the invention is a luminous glazing assembly, comprising:
  a (laminated) multiple glazing unit, having exterior main faces referred to as the first exterior face and second exterior face, including:
    a first (transparent, clear, extra clear) glazing pane, preferably made of (bare or previously coated) mineral and even tempered or even (preferably rigid) organic glass of refractive index n1 preferably lower than 1.6 at 550 nm (more preferably in all the visible spectrum), and even lower than 1.55 or better still lower than or equal to 1.53 at 550 nm (more preferably in all the visible spectrum), preferably from 1.5 to 1.53, having main faces referred to as the internal face and first face, and a first edge face;
    making optical contact with the first glazing pane, especially separated by one or more layers (layer in the broad sense), a second glazing pane (preferably made of transparent, clear or extra clear mineral or even (rigid) organic or even tempered glass) of refractive index n'1 preferably lower than 1.6 at 550 nm (more preferably in all the visible spectrum), and even lower than 1.55 at 550 nm (more preferably in all the visible spectrum) or better still lower than or equal to 1.53 at 550 nm (more preferably in all the visible spectrum), preferably from 1.5 to 1.53, having main faces referred to as the bonding face and second face, the bonding face facing the internal face, and an edge face called the second edge face (the latter being aligned with the first edge face or offset therefrom toward the exterior of the glazing assembly, leaving a peripheral band of the bonding face projecting beyond the first edge face or the edge face opposite the first edge face);
  a first source of (visible) light, preferably an assembly of light-emitting diodes (aligned on a first PCB carrier, in (a) strip(s)) or an extracting optical fiber with a primary light source (diode(s)), optically coupled to the first glazing pane via the first edge face or even via one of the faces on the periphery of the first edge face (especially if a lodging is provided for the diodes),
  the first glazing pane guiding the light emitted by the first light source, the first light source being controlled statically or (preferably) dynamically in order to emit at the instant t0 a first main emission at a first wavelength called $\lambda 1$ and preferably switchable in order to emit at the instant $t' \neq t0$ a second main emission at a second wavelength called $\lambda 2$ preferably distinct from $\lambda 1$ (preferably distinct from $\lambda 1$ by at least 20 nm, 40 nm and even at least 80 nm), and optionally in order to emit (in the white, the red, the green, the blue, etc.) at $t3 \neq t0$ and $t3 \neq t'$ a main (decorative or functional) emission that is better still distinct from the first and/or second main emission;
  first light-extracting means (for extracting the light delivered by the guide) associated with the first glazing pane, comprising one or more first (preferably scattering) extracting features defining a first extracting area (occupying all or some of the internal face and/or of the first face preferably outside of a first marginal zone located on the side on which the optical coupling with the first source takes place, especially occupying a zone, such as a band, extending from the first edge face to the opposite edge face but preferably excluding said first marginal zone), the light extracted being visible on the first-exterior-face side, the first exterior face preferably being the first face, the first extracting means (especially a white scattering layer, preferably defined by a lightness L* of at least 50) being such that the light extracted at said t0 is of a first color called C1 (C1 of main emission $\lambda'1$ substantially equal to $\lambda 1$ for example) and especially at said t' is of a second color called C2 preferably distinct from the first color C1 (C2 of main emission $\lambda'2$),
  these first light-extracting means in particular preferably being scattering means located on the internal-face side (preferably on the internal face, even in or on a first lamination interlayer), and/or on the first-face side (even preferably on the first face) and/or in the bulk of the first glazing pane;
  a second light source, preferably an assembly of light-emitting diodes (diodes aligned on a second PCB carrier, in (a) strip(s), and preferably identical to the first light source) or even an extracting optical fiber with a primary light source (diode(s)), optically coupled to the second glazing pane via the second edge face or even via one of the faces on the periphery of the second edge face (especially if a lodging is provided for the diodes), the second glazing pane guiding the light emitted by the second light source (the second edge face either being on the same side as the first edge face and aligned or offset toward the interior of the glazing assembly or being on the side opposite the first edge face),
  the second light source being controlled, statically or dynamically, in order to emit at said t0 a third main emission at a wavelength called $\lambda 3$ distinct from $\lambda 1$ ($\lambda 3$ preferably differing from $\lambda 1$ by at least 20 nm, at least 40 nm and even at least 80 nm), and preferably in order to emit at said instant t' a fourth main emission at a wavelength called λ4 for example distinct from λ3 (differing from λ3 by at least 20 nm, at least 40 nm and even at least 80 nm) and even distinct from λ2, and especially in order to emit (in the white, the red, the green, the blue, etc.) at t3≠t0 and t3≠t' a main (decorative or functional) emission that is better still distinct from the third and/or fourth (even from the first and/or second) main emission; and second light-extracting means (for extracting the light delivered by the guide) associated with the second glazing pane, comprising one or more second (preferably scattering) extracting features defining a second extracting area, said second feature(s) being offset from the one or more first features, optionally this offset preferably being at most 50 cm and even at most 20 cm or at most 10 cm, and occupying all or some of the bonding face and/or the second face (preferably outside of a second marginal zone located on the side on which the optical coupling with the second source takes place, especially occupying a zone, such as a band, extending from the second edge face to the opposite edge face but preferably excluding said second marginal zone), the light thus extracted being visible on the first-exterior-face side, the second light-extracting means (especially a white scattering layer, preferably defined by a lightness L* of at least 50) being such that the light extracted at t0 is of a color called C3 distinct from C1 (of main emission λ'3 substantially equal to λ3 and differing from λ'1 by at least 20 nm, at least 40 nm and even at least 80 nm) and optionally at said t' of a color called C4 distinct from C3 (C4 of main emission λ'4 substantially equal to λ4 and differing from λ'3 by at least 20 nm, 40 nm and even 80 nm) and even distinct from C2.

The glazing assembly furthermore comprises, between the bonding face and the internal face, a (preferably continuous, flat or curved) transparent optical isolator (of integral construction), called the first optical isolator, of refractive index n2 such that, at the wavelengths of the first light source (and preferably of the second source if there is only one isolator, and more preferably of all the visible spectrum) n1-n2 is at least 0.08, even at least 0.2 and more preferably at least 0.3 (and preferably if there is only one isolator n'1-n2 is at least 0.08 and even at least 0.2 and more preferably at least 0.3), which is located:

facing the internal face at least between the first extracting features (if there are more than one, or even in the aperture of a closed but apertured feature), preferably covering the first extracting area, and/or (preferably and) facing the internal face between the first edge face and (the adjacent edge of) the first extracting area, and preferably facing the internal face between the first extracting area and the edge face opposite the first edge face, said first optical isolator preferably substantially covering the internal face (except possibly in a first so-called marginal zone located on the side on which the optical coupling with the first source takes place and even in one or more other peripheral zones of the internal face);

and if the first isolator is the only isolator (a single optical isolator between the first and second glazing panes) preferably facing the bonding face at least: between the second extracting features (if there are more than one, or even in the aperture of a closed but apertured feature), preferably covering the second extracting area, and/or (preferably and) between the second edge face and (the adjacent edge of) the second extracting area, and preferably between the second extracting area and the edge face opposite the second edge face, said first optical isolator then preferably substantially covering the bonding face (except possibly in a second so-called marginal zone located on the side on which the optical coupling with the second source takes place and even in one or more other peripheral zones of the bonding face).

When the first extracting means are on the internal-face side, the first optical isolator is further from the internal face than the first extracting means and, preferably, when the second extracting means are on the bonding-face side, the first optical isolator (if there is only one) is further from the bonding face than the bonding-face side second extracting means.

The first optical isolator—having first and second main surfaces—is laminated—via the first main surface—to the first glazing pane (to the internal-face side and even to the first extracting means underneath) by means of a first lamination interlayer made of a first transparent, preferably a thermoplastic or even thermosetting polymer that has a refractive index n3 such that, in absolute value, n3-n1 is lower than 0.05 and even lower than 0.03 at the wavelengths of the first light source and preferably in all of the visible spectrum.

There is, between the bonding face and the first optical isolator, a second lamination interlayer made of a second transparent (preferably thermoplastic or even thermosetting) polymer (preferably identical or similar to the first polymer) that has a refractive index n'3 such that, in absolute value, n'3-n'1 is lower than 0.05 and even than 0.03 at the wavelengths of the second light source (and better still of all the visible spectrum) and which makes adhesive contact with the second glazing pane (with the bonding face).

The first optical isolator, which most particularly substantially covers the surface of the first glazing pane facing that of the second glazing pane, promotes the independence of the two distinct colors of the illumination.

The glazing assembly may furthermore comprise, between the internal face and the bonding face, a (preferably continuous and flat) transparent optical isolator (of integral construction), called the second optical isolator, closer to the second extracting means than the first optical isolator and of refractive index n'2 such that, at the wavelengths of the second light source (preferably of all the visible spectrum) n'1-n'2 is at least 0.08, and even at least 0.2 and more preferably at least 0.3, which is located:

facing the bonding face at least between the second extracting features (if there are more than one, or even in the aperture of a closed but apertured feature), preferably covering the second extracting area, and/or (preferably and) between the second edge face and (the adjacent edge of) the second extracting area, and preferably between the second extracting area and the edge face opposite the second edge face, said second optical isolator then preferably substantially covering the bonding face (except possibly in a second so-called marginal zone located on the side on which the optical coupling with the second source takes place and even in one or more other peripheral zones of the bonding face).

When the second extracting means are on the bonding-face side, the second optical isolator is further from the bonding face than the second extracting means.

The second optical isolator is laminated to the second glazing pane (therefore on the bonding-face side and even to the second extracting means) by means of the second lamination interlayer.

Use of this second optical isolator may be desirable if the first optical isolator is located further away from the second glazing pane than from the first glazing pane and/or does not (sufficiently) isolate rays coming from the second light source because of its position and/or extent.

Preferably, between the first optical isolator that is a low-index film (described in detail below) and the internal face no elements other than the aforementioned are added. Preferably, between the optional second optical isolator that is a low-index film (described in detail below) and the bonding face no elements other than the aforementioned are added.

The invention is applicable to decorative luminous panels, luminous dividers, luminous windows or even to the doors of pieces of commercial refrigerating equipment (vertical enclosures and even chests).

The first exterior face is a display face i.e. a face on which the two-color illumination is visible, and preferably corresponds:
to the first face (free face of the laminated glazing unit formed by the first and second glazing panes);
and even preferably to the user-side face for a door of a piece of refrigerating equipment (double or triple glazing unit).

A second extracting feature may be placed inside a first apertured (annular, any geometric pattern, etc.) extracting feature that then frames it.

The first features may be contiguous with the second features, the second features even being interleaved, optionally regularly, between neighboring first features so as to form a continuous bicolor luminous area.

A second extracting feature may be located between two first extracting features. Thus, the first and second areas may interpenetrate (network of spaced features, regularly or irregularly alternating features, etc.).

The expression "second feature offset from the one or more first features" is understood to mean the fact that all or some of the second extracting features do not face the first extracting area (are not superposed with the first extracting area and therefore project (laterally) therebeyond). In other words, the orthogonal projection of the second extracting area in the plane of the first extracting area is not coincident with the first extracting area. The orthogonal projection and the first extracting area may be contiguous or spaced apart.

Preferably, no portion of the second extracting feature is facing (superposed on) a first extracting feature unless it is desired to create color effects, in which case the superposition is then preferably over at least 0.5 mm.

The minimum distance between the first extracting area and the orthogonal projection of the second extracting area in the plane of the first extracting area may be at most 50 mm and even at most 20 mm. Such bicolor features without substantial mixing of the two colors are made possible by the invention.

The light sources are preferably placed on the edge closest to the extracting feature. In certain configurations, the second source may be on the edge face of the edge of the multiple glazing unit adjacent to the edge of the multiple glazing unit with the first edge face. Thus, the second source may be on a lateral edge of the (rectangular) glazing unit and the first source on a longitudinal edge. However, it is often preferable to use two opposite edges of the multiple glazing unit or the same edge.

If the feature is of the frame type, there may be four light sources (one per edge).

The second feature(s) may be offset in X (which is the propagation direction in the first glazing pane and the second glazing pane, perpendicular to the first edge face) and/or in Y perpendicular to X.

Naturally, the first emission has a first given spectral range. Naturally, the second emission has a second given spectral range.

The expression "first (second, respectively) main emission" is, according to the invention, understood to mean the most intense emission in the spectral range emitted at the instant t0 (t', respectively) by the first light source. Furthermore, the expression "third (fourth, respectively) main emission" is, according to the invention, understood to mean the most intense emission in the spectral range emitted at the instant t0 (t', respectively) by the second light source.

Preferably, the spectral range of the first emission is narrow, at most 50 nm, and does not overlap with the spectral range of the second emission, which is also narrow, or overlaps by less than 50 nm for normalized intensities lower than 0.15, for example overlap between the red and the amber or between the green and the blue.

By way of example when the two colors are red and green:
at t0: the first source emits in the green with $\lambda 1$ in a range extending from 515 nm to 535 nm and preferably of spectral width at half-maximum of less than 50 nm (and the light extracted C1 is green defined by a first main emission extracted at $\lambda 1'$ substantially equal to $\lambda 1$, for example distinct by at most 10 nm or at most 5 nm and preferably with a spectral width at half-maximum of less than 30 nm); and
the second source emits in the red with $\lambda 3$ in a range extending from 615 nm to 635 nm and preferably of spectral width at half-maximum of less than 30 nm (and the light extracted C3 is red defined by a third main emission extracted at $\lambda 3'$ substantially equal to $\lambda 3$, for example distinct by at most 10 nm or at most 5 nm and preferably with a spectral width at half-maximum of less than 30 nm), or even being white;
and optionally at t:
the first source emits in the red with $\lambda 2$ in a range extending from 615 nm to 635 nm and preferably of spectral width at half-maximum of less than 30 nm (and the light extracted C2 is red defined by a second main emission extracted at $\lambda 1'$ substantially equal to $\lambda 1$, for example distinct by at most 10 nm or 5 nm and preferably with a spectral width at half-maximum of less than 30 nm);
and preferably, the second source emits in the green with $\lambda 4$ in a range extending from 515 nm to 535 nm and preferably of spectral width at half-maximum of less than 50 nm (and the light extracted C4 is green defined by a fourth main emission extracted at $\lambda 4'$ substantially equal to $\lambda 4$, for example distinct by at most 10 nm or at most 5 nm and preferably with a spectral width at half-maximum of less than 30 nm), or alternatively the first source continues to emit in the red with $\lambda 4$ in a range extending from 615 nm to 635 nm and preferably of spectral width at half-maximum of less than 30 nm (and the light extracted C4 is red defined by a fourth main emission extracted at $\lambda 4'$ substantially equal to $\lambda 1$, for example distinct by at most 10 nm or 5 nm and preferably with a spectral width at half-maximum of less than 30 nm).

In another configuration, for example, at t3 each source emits in the green or in the white. It is also possible for one of the sources to be turned off (therefore creating the following configurations: red and off-state; green and off-state; white and off-state). Provision may be made for a number of decorative zones of distinct colors.

Of course, C1 may be white and C2 a color in the conventional sense and vice versa.

Naturally, the glazing assembly may also operate in a static mode, i.e. provide only the combination C1 and C3 (or C1 and off-state of C2, or C3 and off-state of optional C4). In this case, the first light source may even contain only first diodes at $\lambda 1$ and the second light source only third diodes at $\lambda 3$.

At t0 the first light source may comprise a so-called green diode that emits in the green with $\lambda 1$ in a range extending from 515 nm to 535 nm, and the second source comprises a so-called red diode that emits in the red with $\lambda 3$ in a range extending from 615 nm to 635 nm.

The response of the eye is better in the green than in the red and furthermore (mineral or organic) glass absorbs red light more than green light. Therefore, at the instant t0 (or t') the red color perceived may be too pale. Thus, preferably the flux F1 emitted by the green diode may be lower than 0.8 times the flux F3 emitted by the red diode of the second source and even lower than or equal to 0.7 or 0.6 times F3.

To obtain a flux F1 lower than F3 the light intensity of the red diode may be adjusted so that it is higher than that of the green diode and/or the number of red diodes per unit length of PCB carrier on the first PCB carrier may be higher than the number of green diodes per unit length of PCB carrier on the second PCB.

For example, for first and second PCB carriers of the same length, there may be on each n times the following sequence, n being an integer higher than or equal to 1: two red diodes/one green diode, etc. and/or at t' the first light source may comprise a so-called red light-emitting diode that emits in the red with $\lambda 2$ in a range extending from 615 nm to 635 nm, and the second source a so-called green light-emitting diode that emits in the green with $\lambda 4$ in a range extending from 515 nm to 535 nm, the flux F4 emitted by the green diode at t' being lower than 0.8 times the flux F2 emitted by the red diode.

It may furthermore be desirable to change the color of the first extracting area from red to green without the red appearing too pale or even to invert the colors of the two extracting features at t'.

For a first light source comprising such red and green diodes, the flux F1 emitted by the green first diode may be lower than 0.8 times the flux F2 emitted by the red diode, and even lower than or equal to 0.7 or 0.6 times the flux F2. It is possible for n times the following sequence to be used, n being an integer higher than or equal to 1: two red diodes/one green diode, etc.

The same goes for the second light source, i.e. it is possible for n' times the following sequence to be used, n' being an integer higher than or equal to 1: two red diodes/one green diode, etc.

In the case of a common PCB carrier:
  for the first assembly of diodes, n times the following sequence may be used, n being an integer higher than or equal to 1: two red diodes/one green diode, etc.; and
  for the second assembly of diodes, n' times the following sequence may be used, n' being an integer higher than or equal to 1 preferably equal to n: two red diodes/one green diode, etc.

The normal luminance provided on the first-exterior-face side by the first extracting feature(s) or by the second extracting feature(s) with C1 is preferably at least 80 cd/m².

The normal luminance on the first-exterior-face side of the first extracting area and/or of the second extracting area may be uniform to +/−10 cd/m². However, at t0, if C1 is green and C2 is red the normal luminance on the first-exterior-face side of the former may be lower than the normal luminance on the first-exterior-face side of the latter in order to allow for the response of the eye.

Most of the rays are guided by total internal reflection at the air/first face interface and at the interface between the first interlayer and the first optical isolator. The first optical isolator and the first lamination interlayer are transparent and have refractive indices suitable for the propagation of the guided rays. Thus, most of the rays that are refracted at the internal face/first interlayer then first interlayer/first optical isolator interfaces are reflected by the first optical isolator, the exception being large-angle rays in a zone near the optical coupling edge face. Preferably, hotspots are concealed, over a width W of at least 1 cm and preferably of at most 5 cm and more preferably 3 cm, by a profile.

The first and second light sources are preferably arranged on the same side of the multiple glazing unit (of the glazing assembly) if the edge faces opposite the first and second edge faces are visible. The luminous glazing assembly may comprise, on the periphery of the first edge face and of the second edge face, a profile, especially one partially made of metal, extending over the first face (which face is preferably the first exterior face (display face)) preferably by a distance W of between 1 cm and 3 cm, enclosing or bearing the first light source and the second light source. The profile may thus serve to mask hotspots from sight.

The first and second light sources are preferably arranged on two opposite sides of the multiple glazing unit (of the glazing assembly) if the first and second edge faces are masked—for example by a profile (for mounting the glazing unit, etc.) which may enclose and even house/bear the first and second light sources. More rarely, they are arranged on two adjacent sides. The luminous glazing assembly may thus comprise on the periphery of the first edge face and of the second edge face a profile, preferably a frame, that is especially partially made of metal, with:
  a first jamb on the periphery of the first edge face and extending over the first face (which face is preferably the first exterior face (display face)) preferably by a distance W of between 1 cm and 3 cm, enclosing or bearing the first light source; and
  a second jamb (opposite) on the periphery of the second edge face and extending over the first face (which face is preferably the first exterior face (display face)) enclosing or bearing the second light source.

This profile (first jamb and/or second jamb) does not necessarily make optical contact with the first face, which is preferably the first exterior face (rather than the second exterior face). It may:
  be adhesively bonded by an opaque adhesive or double-sided tape that will absorb the large-angle rays;
  or be adhesively bonded by a transparent adhesive or double-sided tape, the large-angle rays are reflected by the reflective profile and exit further on or are absorbed by the profile, which is opaque (comprises a surface that has been made opaque).

Furthermore, for reasons of cost and extraction efficiency, the first (scattering, white or frosted) extracting features on the first (exterior) face or on the internal face may be spaced apart from the first edge face by at least the distance W (width of the profile) and therefore start level with the unobstructed see-through part of the glazing area.

Moreover, in a peripheral band of width D0—smaller than W—starting from the first edge face, rays from the first source could be refracted into the first lamination interlayer on the internal-face side, into the first optical isolator (the refractive index of which is still too high) and into the second lamination interlayer, and then at the bonding face:

be directly extracted via the second extracting means located on the second face;

or be directly extracted via the second extracting means on the bonding face (especially by the features closest to the second edge face);

or be guided in the second glazing pane (by total internal reflection at the second face/air interface (if a single laminated glazing unit) or second face/air-filled cavity interface (if the laminated glazing unit is part of an insulating glazing unit) then extracted by the second extracting means on the bonding face (especially by the features closest to the second edge face).

These rays thus reach the second extracting means and contaminate the color C3. The color C1 may likewise be contaminated by rays from the second source.

Thus, in a first "anti-mixing" configuration provision is made for an (unapertured) first so-called anti-mixing band, which makes optical contact with the internal face on the periphery of the internal face, and extends from the first edge face (edge face to which the first source is optically coupled) along the first edge face, said band being of width D0 at least equal to 0.8 Dmin and better still equal to Dmin where Dmin=d1/tan $((\pi/2)-\arcsin(n2/n1))$, and better still preferably smaller than 2 cm and even 1 cm in width (and preferably smaller than W in width), where d1 is the distance between the first light source and the internal face.

The first anti-mixing band is preferably opaque (preferably black) and for example located on the same face as the first extracting area and spaced apart from the first extracting area, which is further from the first edge face.

Alternatively, the first band may be scattering (white, etc.) and have a transmission factor in the visible of at most 2% on the internal-face side, and may preferably be of identical nature to the first extracting means, which may for example be produced in the same manufacturing step. If the first anti-mixing band is scattering it is thus preferable for it to be thick enough not to extract light on the side opposite the internal face.

Likewise, the first extracting feature(s) (not masked by a profile or masking layer) may be thick enough not to extract light on the side opposite the internal face.

Preferably the first source (each diode) is of extent (width of the emitting face) W0 smaller than the thickness of the first glazing pane, W0 typically being at most 5 mm, and the first source (each diode) is substantially centered relative to the first edge face, d1 being from 1 to 5 mm and better still from 1 to 3 mm.

For d' the edge of the first source furthest from the internal face is preferably chosen.

Another preferably opaque (preferably black) first anti-mixing band of width D01 at least equal to 0.8 Dmin may preferably also be added on the first-face side (and even on the first face, which face is preferably the first exterior face), this other first anti-mixing band preferably being congruent with the first anti-mixing band.

For example, it is a question of an opaque (preferably black) coating such as an enamel or a coat of paint on the first face or even of an opaque single-sided adhesive tape or of an opaque double-sided adhesive tape or adhesive optionally also serving to fasten a profile to the first face or even of a surface of a (plastic, metal) profile making optical contact with the first face (preferably the first exterior face), said surface being (made) opaque, said profile comprising an opaque (preferably black) coating, a coat of paint for example.

This other first anti-mixing band is used in all the following configurations:

free second face (most rays guided including those disadvantageous as regards mixing, which are then transmitted toward the second scattering features);

second face with a reflective profile making optical contact therewith (rays reflected including those disadvantageous as regards mixing, which are transmitted toward the second scattering features); and second face with a profile with an air-filled cavity (the disadvantageous rays are guided then transmitted toward the second scattering features).

Furthermore, an (unapertured) second so-called anti-mixing band, which preferably makes optical contact with the bonding face on the periphery of the bonding face, and extends from the second edge face (edge face to which the second source is optically coupled) along the second edge face, said band being of a width D'0 at least equal to 0.8 D'min and better still equal to D'min where D'min=d'1/tan $((\pi/2)-\arcsin(n2/n'1))$ and preferably smaller than 2 cm and even 1 cm in width (and preferably smaller than W in width), where d'1 is the distance between the second light source and the bonding face.

The second anti-mixing band is preferably opaque (preferably black) and for example located on the same face and spaced apart from the second extracting area, which is further from the second edge face.

Alternatively, the second anti-mixing band may be scattering (white for example) and have a transmission factor in the visible of at most 2% on the bonding-face side, and may preferably be of identical nature to the second extracting means, which may for example be produced in the same manufacturing step.

Preferably the second source (each diode if it is a question of an assembly of diodes) is of extent (width of the emitting face) W'0 smaller than the thickness of the second glazing pane, W'0 typically being at most 5 mm, and the second source (each diode if it is a question of an assembly of diodes) is substantially centered relative to the second edge face, d'1 being from 1 to 5 mm and better still from 1 to 3 mm.

For d' the edge of the second light source furthest from the bonding face is preferably chosen.

The width of the first (second, etc.) anti-mixing band is preferably limited in order not to eliminate too many rays (including those guidable at the interface with the low-index film).

In particular, in the case of a multiple glazing unit that is a laminated glazing unit (second face being the same as the second exterior face) not forming an insulating glazing unit, a preferably opaque other second anti-mixing band of width D02 at least equal to 0.8 D'min may preferably also be added on the second-face side (and even on the second face), this other second anti-mixing band preferably being congruent with the second anti-mixing band.

For example, it is a question of an opaque (preferably black) coating such as an enamel or a coat of paint on the second face or even of an opaque single-sided adhesive tape or even of an opaque double-sided adhesive tape or adhesive serving to fasten a profile or even of a surface of a profile making optical contact with the second face (preferably the second exterior face), said surface being (made) opaque, said profile comprising an opaque (preferably black) coating, a coat of paint for example.

If the multiple glazing unit forms an insulating glazing unit (double or triple glazing unit), then it comprises a third glazing pane having a third main face and a fourth main face, the second and third faces being spaced apart by a first gas-filled cavity, and, on the periphery of the second and third faces, a first framing polymer seal, which is a preferably black mastic such as a polysulfide or polyurethane mastic, forms part of and even forms the preferably opaque other second anti-mixing band.

The width of the first seal may be at least 3 mm and preferably at most 6 mm.

Usually, an interlayer is adhesively bonded to the first seal and to the second and third faces by a preferably opaque, for example black, butyl rubber that also has the role of sealing the interior of the insulating glazing unit from water vapor. The width of the butyl rubber may be at least 2 mm and preferably at most 6 mm.

The first seal, which is made from a material such as a polysulfide or polyurethane, and the butyl rubber may together form the other preferably opaque second anti-mixing band.

Table I below gives examples of Dmin as a function of n2 and n1 and of d1. It may be used as a lookup table.

TABLE I

| n1 | n2 | d1 (mm) | Dmin (mm) |
|---|---|---|---|
| 1.5 | 1.15 | 1 | 1.2 |
| 1.52 | 1.15 | 1 | 1.2 |
| 1.5 | 1.2 | 1 | 1.3 |
| 1.52 | 1.2 | 1 | 1.3 |
| 1.5 | 1.25 | 1 | 1.5 |
| 1.52 | 1.25 | 1 | 1.4 |
| 1.5 | 1.3 | 1 | 1.7 |
| 1.52 | 1.3 | 1 | 1.7 |
| 1.5 | 1.35 | 1 | 2.1 |
| 1.52 | 1.35 | 1 | 1.9 |
| 1.5 | 1.4 | 1 | 2.6 |
| 1.52 | 1.4 | 1 | 2.4 |
| 1.5 | 1.15 | 3 | 3.6 |
| 1.52 | 1.15 | 3 | 3.5 |
| 1.5 | 1.2 | 3 | 4.0 |
| 1.52 | 1.2 | 3 | 3.9 |
| 1.5 | 1.25 | 3 | 4.5 |
| 1.52 | 1.25 | 3 | 4.3 |
| 1.5 | 1.3 | 3 | 5.2 |
| 1.52 | 1.3 | 3 | 5.0 |
| 1.5 | 1.35 | 3 | 6.2 |
| 1.52 | 1.35 | 3 | 5.8 |
| 1.5 | 1.4 | 3 | 7.8 |
| 1.52 | 1.4 | 3 | 7.1 |
| 1.5 | 1.4 | 5 | 13.0 |
| 1.52 | 1.4 | 5 | 11.8 |

The opaque first anti-mixing band is preferably black and may therefore be:
- preferably an opaque coating making optical contact with the internal face and better still located (directly) on the internal face, such as:
  - an ink (for example on the internal face or printed on the first lamination interlayer on the internal-face side or even on the opposite face);
  - an enamel (on the internal face of the first preferably mineral glazing pane);
  - a paint, for example on the internal face; or
  - an opaque adhesive, an opaque adhesive band;
- an opaque coating on a carrier adhesively bonded to the internal face, this carrier especially being a (flexible) transparent (transparent or tinted) plastic (such as PET etc.), a thin glass sheet or a part (profile) made of metal, plastic or wood, or even the PCB carrier of side-emitting diodes of the first source (part of the especially metal or plastic or wooden mounting or fastening profile); or
- even an opaque part adhesively bonded to the internal face (part of the metal or plastic or even wooden mounting or fastening profile) and located in a groove between the first and second glazing panes.

The opaque, and preferably black, second anti-mixing band is preferably made of the same material as the opaque first anti-mixing band and as above. Each is preferably an opaque coating on the face in question and better still an opaque deposit such as an enamel, above all when there is no profile thereabove. The other first anti-mixing band is for example an opaque single-sided (under a profile) or double-sided adhesive in order to adhesively bond a (metal, especially reflective) profile.

In the zone of the first anti-mixing band, the first interlayer and/or the first optical isolator may be absent and therefore recessed relative to the first edge face by at least D0.

The first glazing pane may project beyond the second glazing pane (on the first-edge-face side, the second edge face preferably being on the opposite side of the glazing assembly) so that the first anti-mixing band is in this projecting zone, the area of this band possibly being free or located under a profile. The first anti-mixing band and the other first anti-mixing band are for example an opaque single-sided (under a profile) or double-sided adhesive for bonding a profile.

In the zone of the second anti-mixing band, the second interlayer and/or the second optical isolator may be absent and therefore recessed relative to the second edge face by at least D'0.

The second glazing pane may project beyond the first glazing pane (on the second-edge-face side preferably on the opposite side of the glazing assembly to the first edge face) so that the second anti-mixing band is in this projecting zone, the surface of this band possibly being free or located under a profile. The second anti-mixing band and the other second anti-mixing band are for example an opaque single-sided (under a profile) or double-sided adhesive for bonding a profile.

Dmin and D'min are equal if the same glazing panes and the same optical isolator(s) are chosen. D0 and D'0 are equal for the sake of simplicity.

The first and second anti-mixing bands may be facing if the first and second edge faces, on the same side of the multiple glazing unit (of the glazing assembly), are aligned. The first and second bands may be facing, even congruent and if not be on opposite sides of the glazing assembly (if the first and second edge faces are on opposite sides).

In one preferred embodiment, the first and second light sources being on opposite sides of the multiple glazing unit (of the glazing assembly), the first glazing pane projects beyond the second edge face and thereby forms a first projecting region and the preferably opaque first masking band, which is especially an opaque adhesive, is located in the first projecting region on the internal face and a preferably opaque other first masking band, which is especially an opaque adhesive, is even located in the first projecting region on the first face.

On a face with (white) enamel first extracting features, an opaque first masking band made of a (black) enamel may be used.

Furthermore, the second glazing unit projects beyond the first edge face and thereby forms a second projecting region and the preferably opaque second masking band, which is especially an opaque adhesive, is located in the second projecting region, and a preferably opaque other second masking band, which is especially an opaque adhesive, is even located in the second projecting region on the second face, which is preferably the second exterior face.

On a face with (white) enamel second extracting features, alternatively an opaque second masking band made of a (black) enamel may be used.

The double-sided or single-sided (preferably black) opaque adhesive tape used for the anti-mixing band Is preferably less than 1 mm in thickness, and even less than 0.5 mm or 0.3 mm in thickness.

When the first and second glazing panes are edge to edge, there may be, in the zone of the first anti-mixing band (even in that of the facing second band), a groove between the first and second glazing panes without the first and (second) interlayers or the first (and second) optical isolator and optionally with a part having an opaque coating in order to form the first anti-mixing band. An opaque part may be inserted more easily if its thickness (smaller than the distance between the first and second glazing panes) is at most 0.8 mm and even at most 0.5 mm.

When the first and second glazing panes are edge to edge, in the zone of the second anti-mixing band (for example on the side of the glazing assembly which is opposite that of the first band), there may be a groove between the first and second glazing pane without the first (and second) interlayer or the first (and second) optical isolator and optionally with a part having an opaque coating in order to form the first anti-mixing band. An opaque part may be inserted more easily if its thickness (dimension between the glazing panes) is at most 0.8 mm and even at most 0.5 mm.

According to the invention, a first glazing pane with an opaque first anti-mixing band has, on the side furthest from the first glazing pane facing said first band:

an absorption (at the main wavelengths $\lambda 1$, even $\lambda 2$ and even in all the visible) of at least 80% and even of at least 90% or of at least 95%, and a transmission factor (at the main wavelengths $\lambda 1$, even $\lambda 2$ and even in all the visible) of at most 2% and even of at most 1% or of at most 0.5% (especially a TL of at most 2% and even 1% or 0.5%);

and/or an optical density of at least 2 and preferably at least 2.5 and even 3, more preferably from 2.8 to 4.5 and in particular from 3 to 4.

The same preferably goes for the opaque other first anti-mixing band.

According to the invention, a first glazing pane with a scattering first anti-mixing band has, on the side furthest from the first glazing pane facing said first band:

a transmission factor (at the main wavelengths $\lambda 1$, even $\lambda 2$ and even in all the visible) of at most 2% and even of at most 1% or of at most 0.5% (especially a TL of at most 2% and even 1% or 0.5%).

The same preferably goes for the scattering other first anti-mixing band.

According to the invention, a second glazing pane with a second anti-mixing band has, on the side furthest from the second glazing pane facing said second band:

an absorption (at the main wavelengths $\lambda 3$ and even $\lambda 4$, or in all the visible) of at least 80% and even of at least 90%, and a transmission factor (at the main wavelengths $\lambda 3$ and even $\lambda 4$ and even in all the visible) of at most 2% and even of at most 1% or of at most 0.5% (especially a TL of at most 2% and even 1% or 0.5%);

and/or an optical density of at least 2 and better still of at least 2.5 and even 3, more preferably from 2.8 to 4.5 and in particular from 3 to 4.

The same preferably goes for the opaque other second anti-mixing band.

According to the invention, a second glazing pane with a scattering second anti-mixing band has, on the side furthest from the second glazing pane facing said second band:

a transmission factor (at the main wavelengths $\lambda 3$, even $\lambda 4$ and even in all the visible) of at most 2% and even of at most 1% or of at most 0.5% (especially a TL of at most 2% and even 1% or 0.5%).

The same preferably goes for the scattering other second anti-mixing band.

Furthermore, the aforementioned opaque anti-mixing bands preferably have a limited light reflectivity of at most 5% at the main wavelengths.

The first and second anti-mixing bands according to the invention may preferably be black or gray (dark colors).

In what is referred to as an "anti-mixing" configuration that may be used as an alternative or in addition to the aforementioned anti-mixing bands, the first light source comprising an assembly of diodes (aligned, on a first PCB carrier) comprising a first light-emitting diode with said first main emission at $\lambda 1$ and especially a second light-emitting diode with said second main emission at $\lambda 2$, each of the first and optional second diodes is spaced apart from the first edge face—by a space, air—(preferably by less than 5 mm and even at most 2 mm) and at least 80% (preferably at least 90% and even at least 95%) of the light flux emitted by each of the first and optional second diodes is in an emission cone between $-\alpha 1$ and $\alpha 1$ where $\alpha 1 = \arcsin(n1 * \sin(\alpha 2))$ and where $\alpha 2 = (\pi/2) - \arcsin(n2/n1)$ corresponds to the angle of refraction in the first glazing pane, especially by first collimating means (on the emitting chips).

Furthermore, the second light source comprising an assembly of diodes (aligned, on a second PCB carrier) comprising a third light-emitting diode with said third main emission at $\lambda 3$ and optionally a fourth light-emitting diode with said fourth main emission at $\lambda 4$, the third diode, or even the optional fourth diode, is spaced apart from the second edge face—by a space, by air—(preferably by less than 5 mm and even at most 2 mm) and at least 80% (better still at least 90% and even at least 95%) of the light flux emitted by each of the third and fourth diodes is in an emission cone between $-\alpha'1$ and $\alpha'1$ where $\alpha'1 = \arcsin(n'1 * \sin((\alpha'2))$ and where $\alpha'2 = (\pi/2) - \arcsin(n'2/n'1)$ corresponds to the angle of refraction in the second glazing pane, especially by second collimating means.

It is desired for total internal reflection to take place at the interface with the first optical isolator for all angles, including large angles.

$\arcsin(n2/n1)$ substantially corresponds to the angle of total reflection at the interface with the first optical isolator ($\alpha'2$ is the complementary angle of this total reflection). More precisely, the quantity used should be $\arcsin(n2/n3)$ but since n3 is very similar to n1 the impact is negligible.

Table II' below gives examples of $\alpha 1$ and $\alpha r$ as a function of n2 for n1 equal to 1.5, where $\alpha r$ is the angle of refraction

TABLE II

| α1 (°) | αr (°) |
|---|---|
| 30 | 20 |
| 35 | 22 |
| 40 | 25 |
| 45 | 28 |
| 50 | 31 |
| 60 | 35 |

Table II' below indicates examples of α1 (emission angle for total reflection), α2 (angle of refraction for total reflection at the interface of the first optical isolator) as a function of n2 for n1 equal to 1.5 or 1.52. It may be used as a lookup table

TABLE II'

|  |  | n2 = 1.4 | n2 = 1.35 | n2 = 1.3 | n2 = 1.25 | n2 = 1.2 | n2 = 1.15 | n2 = 1.1 |
|---|---|---|---|---|---|---|---|---|
| α2 | n1 = 1.5 | 21 | 26 | 30 | 34 | 37 | 40 | 43 |
| α2 | n1 = 1.52 | 23 | 27 | 31 | 35 | 38 | 41 | 44 |
| α1 | n1 = 1.5 | 33 | 41 | 48 | 56 | 64 | 74 |  |
| α1 | n1 = 1.52 | 36 | 44 | 51 | 59 | 67 | 79 |  |

Below n2=1.15 and even below n2=1.2 conventional diodes without collimating means may be chosen.

Preferably, most and better still all the diodes of the first and second light sources have such a narrow emission pattern, especially because collimating means are used.

The collimation is individual or even common to a plurality of diodes of each source, etc.

Naturally, as many diodes emitting at λ1 and diodes emitting at λ2 as required are used and their distribution (number, spacing) is adjusted so as to extend along the edge face in the first extracting area. It may be chosen to alternate λ1 and λ2 or not.

Other diodes may be added to provide novel functionalities or light colors and preferably their emission pattern is also chosen to be narrow.

In particular to produce even more luminous zones with other colors, it is possible to add N (equal to 1 or more) times on the second face: lamination interlayer/optical isolator/lamination interlayer/additional glazing pane, with additional extracting means associated with the additional glazing pane defining an additional extracting area offset from the first and second extracting areas (from all the other extracting areas), and a suitable additional light source coupled to the edge face of the additional glazing pane.

When an extracting optical fiber is chosen for each primary source, narrow emission patterns may also be chosen.

Advantageously, the first light source is an assembly of light-emitting diodes—preferably aligned—on a printed circuit board called the first PCB carrier (preferably a strip/rectangular bar) and the diodes are coupled to the first edge face, and the second light source is an assembly of light-emitting diodes—preferably aligned—on a printed circuit board called the second PCB carrier (preferably a strip/rectangular bar) and the diodes are coupled to the second edge face. The first and second PCB carriers are spaced apart, contiguous or a common PCB carrier (first and second edge face on the same side of the multiple glazing unit).

The second edge face is aligned with or even offset from the first edge face or aligned with or preferably offset from the edge face opposite the first edge face (diodes on opposite sides of the glazing assembly or more broadly on different sides for example adjacent or opposite sides).

Moreover, the glazing assembly may comprise:
a preferably opaque first means, called a partition, partially or completely preventing refraction of the light emitted by the first light source at the edge face of the multiple glazing unit between the internal face and the second (exterior) face on the first-edge-face side, in particular if the first glazing pane does not project beyond the second glazing pane on the first-edge-face side, and preferably a preferably opaque second means, called a partition, partially or completely preventing refraction of the light emitted by the second light source at the edge face of the multiple glazing unit between the bonding face and the first (exterior) face on the second-edge-face side, in particular it the second glazing pane does not project beyond the first glazing pane on the second-edge-face side;
or better still when the first and second light sources are on the same side of the multiple glazing unit, a preferably opaque means, called a common partition, partially or completely preventing refraction of the light emitted by the first light source at the multiple-glazing-unit edge face between the internal face and the second face on the first-edge-face side and partially or completely preventing refraction of the light emitted by the second light source at the edge face of the multiple glazing unit between the bonding face and the first (exterior) face on the first-edge-face side, in particular if the second glazing pane does not project beyond the first glazing pane on the second-edge-face side (or by less than 1 mm) and in particular if the first and second edge faces are aligned.

The first (second, respectively) partition preferably absorbs (all or some, at least most) of the most lateral rays—for example emitted in the green—of the first (second, respectively) source, which rays are not guided into the first (second, respectively) edge face and could be guided into the central edge face and extracted via the second (first, respectively) extracting means—for example intended to extract red light.

The common partition preferably absorbs (all or some, at least most of):
the most lateral rays—for example emitted in the green—of the first source, which rays are not guided into the first edge face and could be guided into the central edge face and extracted via the second extracting means—for example intended to extract red light; and
the most lateral rays—for example emitted in the red—of the second source (diodes), which rays are not guided into the second edge face (respectively) and could be guided into the central edge face and be extracted via the first extracting means—for example intended to extract green light.

The first, second or common partition preferably comprises an added part (strip, of rectangular cross section, etc.)

that is opaque or comprises one or more opaque coatings. It may be a hollow or solid part.

It would be more complicated for example to coat the edge face between the bonding face and the internal face with an opaque layer (adhesive tape or paint).

If the first glazing pane projects beyond the second glazing pane on the first-edge-face side and better still if the second edge face is opposite the first edge face, the first partition may be an opaque flange (or a flange that has been made opaque) of a U-shaped (plastic or metal) or L-shaped profile bearing and/or enclosing the first light source (diodes).

If the second glazing pane projects beyond the first glazing pane on the first-edge-face side, the second partition may be an opaque flange (or a flange that has been made opaque) of a U-shaped or L-shaped profile bearing and/or enclosing the second light source (diodes).

The double-sided or single-sided (preferably black) opaque adhesive tape used for the opaque coating of the first, second or common partition is preferably less than 1 mm in thickness, and even less than 0.5 mm or 0.3 mm in thickness.

According to the invention, the opaque first partition—an opaque part or a part comprising an opaque coating on the first-source (diodes) side, parallel to the plane of the first glazing pane on (any) part—has:
- an absorption (at the main wavelengths $\lambda 1$, even $\lambda 2$, even in all the visible) of at least 80% and even of at least 90% or of at least 95%, and a transmission factor (at the main wavelengths $\lambda 1$, even $\lambda 2$ and even in all the visible) of at most 2% and even of at most 1% or of at most 0.5% (especially a $T_L$ of at most 2% and even 1% or 0.5%);
- and/or an optical density of at least 2 and better still of at least 2.5 and even 3, more preferably from 2.8 to 4.5 and in particular from 3 to 4.

According to the invention, the opaque second partition—preferably an opaque part or a part comprising an opaque coating on the second-source (diodes) side, parallel to the plane of the first glazing pane on (any) part—has:
- an absorption (at the main wavelengths $\lambda 3$, even $\lambda 4$, even in all the visible) of at least 80% and even of at least 90% or of at least 95%, and a transmission factor (at the main wavelengths $\lambda 3$, even $\lambda 4$ and even in all the visible) of at most 2% and even of at most 1% or of at most 0.5% (especially a $T_L$ of at most 2% and even 1% or 0.5%);
- and/or an optical density of at least 2 and better still of at least 2.5 and even 3, more preferably from 2.8 to 4.5 and in particular from 3 to 4.

According to the invention, the first (second, respectively) partition is preferably a part comprising an opaque or even scattering coating on the first-source side (second-source side, respectively), (substantially) parallel to the plane of the first glazing pane (second glazing pane, respectively).

According to the invention, the common partition is preferably a part comprising an opaque or even scattering coating on the first-source (diodes) side, parallel to the plane of the first glazing pane, and an opaque or even scattering coating on the second-source (diodes) side, (substantially) parallel to the plane of the second glazing pane.

The opaque common partition has:
- an absorption (at the main wavelengths $\lambda 1$, even $\lambda 2$, even in all the visible) of at least 80% and even of at least 90% or of at least 95%, and a transmission factor (at the main wavelengths of $\lambda 1$, even $\lambda 2$ and even in all the visible) of at most 2% and even of at most 1% or of at most 0.5% (especially a TL of at most 2% and even 1% or 0.5%);
- and/or an optical density of at least 2 and better still of at least 2.5 and even 3, more preferably from 2.8 to 4.5 and in particular from 3 to 4.

And:
- an absorption (at the main wavelengths $\lambda 3$, even $\lambda 4$, even in all the visible) of at least 80% and even of at least 90% or of at least 95%, and a transmission factor (at the main wavelengths $\lambda 3$, even $\lambda 4$ and even in all the visible) of at most 2% and even of at most 1% or of at most 0.5% (especially a TL of at most 2% and even 1% or 0.5%);
- and/or an optical density of at least 2 and better still of at least 2.5 and even 3, more preferably from 2.8 to 4.5 and in particular from 3 to 4.

By way of example, mention may be made of a part comprising a deposit (enamel, paint, etc.) comprising an opaque single-sided or multi-sided adhesive tape on two lateral faces of the part if the partition is a common partition. At a pinch, a scattering partition having a low $T_L$ (transmission factor of less than 2%) could be chosen, but some of the rays may still end up in the wrong place (be guided into the glass and not absorbed by an anti-mixing band).

Preferably the first (second, respectively) partition, such as a part comprising an opaque coating, does not extend over the first (second, respectively) edge face or does so by less than 1 mm. Preferably the common partition, such as a part comprising opaque coatings, does not extend over the first and second edge faces or does so by less than 1 mm.

The total thickness E1+E2+E3, where E1 is the thickness of the first lamination interlayer, E2 the thickness of the first (only) optical isolator and E3 the thickness of the second lamination interlayer, is typically less than 1.5 mm and even than 1 mm if the first optical isolator is a film (of at most 200 μm) directly between the two interlayers.

The thickness E1+E2+E4+E'2+E3, where E1 is the thickness of the first lamination interlayer, E2 the thickness of a first optical isolator that is a deposit, E4 the thickness of a central (preferably mineral) glass sheet and E'2 the thickness of the second optical isolator, is typically less than 6 mm.

The first (second, respectively) partition or common partition preferably has a thickness smaller than or equal to the thickness between the internal face and the bonding face or the thickness of the so-called central edge face. The first (and the second) partition or the common partition is preferably of a thickness (direction parallel to the thickness of the multiple glazing unit) of at most E1+E2+E3+1 mm or E1+E2+E4+E'2+E3+1 mm.

The first (and second) partition or the common partition comprises a part (carrying the preferably opaque coating(s)) preferably against or spaced apart from the so-called central edge face (edge face between the internal face and the bonding face) of the multiple glazing unit by at most 1 mm and even at most 0.5 mm.

Preferably, there is no adhesive or any other fastening means between the first (and second) partition or the common partition and the central edge face.

The first (and second) partition or the common partition, such as a part (strip) comprising one or more opaque coatings, is fastened (adhesively bonded) to or in a notch of the common PCB carrier or of another part (a profile for example).

The first (second, respectively) partition comprises a part comprising an opaque coating, preferably projecting relative to the first (second, respectively) light source in the direction of the first (second, respectively) edge face. The first partition may comprise a part that is placed in abutment with the edge face of the multiple glazing unit during mounting.

The common partition may comprise a part comprising opaque coatings, preferably projecting relative to the first light source (diodes) and second light source (diodes) in the direction of the first and second edge faces.

Preferably, the first assembly of light-emitting diodes and the second assembly of light-emitting diodes are for example arranged on the same side of the multiple glazing unit (of the glazing assembly) and the glazing assembly comprises a preferably opaque partition, called a common partition, between the first assembly and the second assembly of light-emitting diodes, completely or partially preventing refraction of the light emitted by the first assembly of diodes at the edge face between the internal face and second face and completely or partially preventing refraction of the light emitted by the second assembly of diodes at the edge face between the bonding face and first face, this common partition optionally being separate from the first and second PCB carriers if the diodes are side-emitting diodes, and projecting relative to the first and second assemblies of light-emitting diodes (and even the first and second PCB carriers) in the direction of the first and second edge faces.

Better still, the first assembly of light-emitting diodes and the second assembly of light-emitting diodes are for example arranged on the same side of the multiple glazing unit (of the glazing assembly) and are top-emitting diodes, the first and second edge faces being on the same side, and a PCB carrier, called a common PCB carrier, forms the first and second PCB carriers and has a main face facing the first and second edge faces and bears a preferably opaque common partition between the first assembly and second assembly of light-emitting diodes, the common partition completely or partially preventing refraction of the light emitted by the first assembly at the edge face between the internal face and second face and completely or partially preventing refraction of the light emitted by the second assembly at the edge face between the bonding face and the first face, the common partition preferably protruding relative to the first and second assemblies of light-emitting diodes in the direction of the first and second edge faces.

The first and second PCB carriers may therefore be located on a common PCB carrier if the first and second edge faces are on the same side and preferably substantially aligned (and better still with a distance of at most 5 mm and even of at most 2 mm between diodes and first or second edge faces).

For top-emitting diodes (conventional diodes), the common PCB carrier may therefore be sufficiently wide to bear first and second assemblies of diodes. The common PCB carrier (and the diodes) may even be bonded to the first and second edge faces of the glazing assembly using an optical adhesive or a transparent double-sided adhesive above all when the diodes have a primary encapsulation.

For side-emitting diodes, the common PCB carrier may bear the first assembly on its first main face and the second assembly on its opposite face and even form the common partition. Alternatively, the first and second PCB carriers are adhesively bonded or spaced apart, for example by a separator; the assembly may form the common partition.

Provision is made for one or more partitions, above all if each assembly of diodes has a wide emission pattern (half emission angle at half maximum of 50° or even 60° for example) and even when the emitting faces are at a distance from the edge faces of at most 5 mm and even at most 2 mm.

Provision may therefore be made for a common partition between the first and second assemblies of diodes arranged on the same side of the multiple glazing unit (of the glazing assembly) (especially when there is no notable offset, of more than 1 mm, between the first edge face and the second edge face), which is:
 an (intrinsically) opaque part or a part comprising one or more opaque coatings added (fastened by any means) to a profile (optionally a profile for mounting the glazing assembly or for fastening the first light source to the first edge face, this fastening profile being located in the internal volume defined by the mounting profile) or added to the common PCB carrier or to one of the first or second separate PCB carriers;
 or even a part, said part being opaque or comprising one or more opaque coatings, of a profile (for mounting the glazing assembly or for fastening the first light source to the first edge face, this fastening profile being located in the internal volume defined by the mounting profile) for example a profile having an E-shaped or double-C-shaped or indeed an F-shaped or even a 90°-rotated-T-shaped cross section;
 or, if the diodes are side-emitting diodes, the opaque or opaque-coating-comprising PCB carrier(s), which PCB carrier(s) is (are) especially located in a groove between the first and second glazing panes (especially formed by setting back the elements between the first and second glazing panes—such as the first interlayer, the first isolator and the second interlayer).

The first (second) PCB carrier or the common PCB carrier may be made of a metal (aluminum, copper, etc.) or an (epoxy) resin composite reinforced with glass fibers (often called an FR-4 board) and for example be of millimeter-sized thickness, especially of at most 2 mm and even less than 1 mm in thickness, and be opaque.

The first (second) PCB carrier may be fastened (adhesively bonded) to a metal element (profile) via its back side preferably by a thermal adhesive. The first (second) light source (diodes) may then be spaced apart from the first (second) edge face.

The common PCB carrier may be fastened (adhesively bonded) to a metal element (profile) via its back side preferably by a thermal adhesive. The light sources (diodes) may then be spaced apart from the first and second edge faces.

The first light source is preferably a first assembly of light-emitting diodes—preferably aligned—on a printed circuit board called the first PCB carrier (preferably a strip), this first PCB carrier and/or first assembly being adhesively bonded to the first edge face by an optical adhesive or a transparent double-sided adhesive (preferably of thickness of at most 1 mm and even of at most or better still submillimeter-size) above all when the diodes have a primary encapsulation, or the first assembly being against or spaced apart from the first edge face by at most 5 mm and even at most 2 mm—by air (or a vacuum).

Furthermore, the second light source is preferably a second assembly of light-emitting diodes—preferably aligned—on a printed circuit board called the second PCB carrier, this second PCB carrier and/or second assembly being adhesively bonded to the second edge face by an optical adhesive or a transparent double-sided adhesive (preferably of thickness of at most 1 mm and even submillimeter-size) above all when the diodes have a primary encapsulation, or being against or spaced apart from the second edge face by at most 5 mm and even at most 2 mm—by a space, by air (or a vacuum).

The first and second light sources, preferably a first assembly of light-emitting diodes and a second assembly of light-emitting diodes, being arranged on the same side of the multiple glazing unit (of the glazing assembly), the first and second edge faces therefore being on the same side, the glazing assembly may comprise a profile extending over the first exterior face, namely the first face, or the first-face side (and optionally extending over the second exterior face) and facing the first and second edge faces, defining a volume containing the first and second light sources (the first and second PCB carriers and the first and second assemblies of light-emitting diodes).

This profile may simply be a frame or serve to mount (integrate) the glazing assembly in the case of a divider, a window or a door of a piece of furniture (piece of refrigerating equipment).

In the case of a decorative (wall, etc.) panel the multiple glazing unit may (simply) be the laminated glazing unit, and the especially U-shaped profile may comprise:
  a web facing the first and second edge faces (the edge face of the multiple glazing unit);
  a first flange fastened to the first exterior face by adhesive bonding or by virtue of a snug fit; and
  a second flange fastened to the second exterior face by adhesive bonding or by virtue of a snug fit.

The profile may also be L-shaped (no wall-side second flange).

This profile may bear the light sources (and the carriers thereof).

In the case of a divider, the multiple glazing unit may (simply) be the laminated glazing unit, and the especially U-shaped profile may comprise:
  a web facing the first and second edge faces (the edge face of the multiple glazing unit), which web is against, adhesively bonded to or spaced apart from the bottom portion;
  a first flange fastened to the first exterior face—joined by a seal to the first exterior face and spaced apart from the lateral portion;
  a second flange joined by a seal to the second exterior face, and removable (glazing bead).

The web may be spaced apart, preferably by at most 3 cm and even at most 1 cm, from the first edge face (and the second edge face).

The first flange may be made of metal and comprise an opaque coating (preferably black single-sided adhesive tape, preferably black deposit, etc.), which coating is internal, i.e. on the same side as the first light source. Furthermore, the second flange may be made of metal and comprise an opaque coating (preferably black single-sided adhesive tape, preferably black deposit, etc.), which coating is internal, i.e. on the same side as the second light source.

For the decorative wall panel it is not necessary to see the double illumination of the two sides. Thus, a reflective surface may make optical contact with the second exterior face. It may be a question of a silvered layer on the second exterior face. An illuminating mirror is thus formed.

The illuminating divider of the invention is intended for any type of internal and/or external use, in a building or in a vehicle (especially one providing transport, etc.), in a public space, as a divider between rooms, compartments, a divider inside one and the same room, to form a door, a window, a counter, an interior decoration device, a balustrade, an item of furniture, or a floor lamp, in particular one having a parallelepipedal shape, etc.

Moreover, the glazing assembly, especially the divider, is preferably transparent beyond the light extracting means.

Optionally, the multiple glazing unit is equipped on the first or second exterior main face with a semi-reflective half-silvered-mirror type coating for example such as the product sold under the name Mirastar by the Applicant, this mirror for example being partial between the extracting patterns if they are located on the same exterior face or between and on the extracting patterns.

It will be noted that the additional profile is not necessarily fixed to the floor but could be fixed to another receiving surface.

Moreover, the partition is not necessarily immovable; it may be movable relative to the surface (floor, ceiling, etc.) with which it is associated.

In an (insulating) double-glazing or (insulating) triple-glazing configuration, the light sources are preferably pre-mounted before an additional profile, generally a frame, is installed.

Furthermore, the multiple glazing unit may form an insulating glazing unit and comprise a third glazing pane having a third main face and a fourth main face (the outermost if an insulating double glazing unit) and a third edge face, the second and third faces being spaced apart by a first gas-filled cavity, a framing first polymer seal being placed on the periphery of the second and third faces, and even also comprise a fourth glass sheet having fifth and sixth faces, spaced apart from the second glazing pane on the fourth-face side by a second gas-filled cavity, and, on the periphery of the fourth and fifth faces, a framing second polymer seal, and an interlayer.

The first and second light sources are arranged on the same side of the multiple glazing unit (of the glazing assembly). The glazing assembly comprises a profile called a positioning profile, preferably internal to an additional over-profile especially for mounting the glazing assembly (profile of a piece of refrigerating equipment, of a window, etc.) and preferably made of metal, which comprises:
  a preferably metal portion called a bottom portion facing the edge face of the multiple glazing unit including the first and second edge faces and an edge face called a central edge face—preferably bearing the first and second PCB carriers and with top-emitting diodes or bearing the common PCB carrier;
  a first lateral portion against or adhesively bonded to the first exterior face and increasing thickness by at most 1.5 mm and even at most 1 mm and for example being a metal sheet or an opaque element (single-sided adhesive tape, preferably black for example) adhesively bonded to the bottom portion and to the first exterior face (which is preferably the first face) the bottom portion and the first lateral portion especially forming an L-shaped cross section; and
  either a portion that is opaque (that has been made opaque) (part having opaque coatings substantially parallel to the plane of the multiple glazing unit) forming a (common) partition partitioning, the light of the first and second light sources and against the central edge face (between the internal face and bonding face) or spaced apart by less than 1 mm therefrom—the light sources preferably being a first assembly of light-emitting diodes and a second assembly of light-emitting diodes—which portion is fastened to or integral with the bottom portion; or an opaque partition (part having opaque coatings parallel to the plane of the multiple glazing unit) partitioning the light of the first and second light sources, which partition is separate from the positioning profile and against the central edge face (for example on an especially common PCB carrier) or spaced apart by less than 1 mm therefrom; the bottom portion, the first lateral portion and the portion forming a partition especially forming an F-shaped cross section.

The glazing assembly furthermore comprises a part, called a fastening part, adjacent to and extending along the second edge face, which part is fastened to the first polymer seal by any fastening means (mechanical means, adhesive means, double-sided adhesive means) and securely fastened to or indeed even integral with the bottom portion, the bottom portion especially being a lateral extension of the fastening part. The especially metal fastening part may have an opaque coating on the second-light-source side, for example a black single-sided adhesive tape.

The bottom portion may be spaced apart, preferably by at most 3 cm and even at most 1 cm, from the first edge face. The bottom portion may be at most 5 mm and even 3 mm in thickness.

Furthermore, the optional additional profile comprises:
a web (made of metal, plastic or a metal web portion extended by a plastic web portion) facing the first and second edge faces (the edge face of the multiple glazing unit), which web is against, adhesively bonded to or spaced apart from the bottom portion;
a (metal) first flange fastened to the first exterior face and above the first lateral portion and with a portion projecting beyond the first lateral portion toward the center of the multiple glazing unit, said flange preferably being fastened with an (opaque, most often black) adhesive called a mounting adhesive, the optional mounting adhesive being absent from the region between the first edge face and the first light source, and between the second edge face and the second light source (web and first flange especially forming an L-shaped cross section), and even between the first exterior face and the projecting portion;
and optionally a second flange (made of plastic, extension of the plastic second web portion) adhesively bonded to the second exterior face, the web, first flange and second flange especially forming a U-shaped cross section.

The web may be spaced apart, preferably by at most 3 cm and even at most 1 cm, from the first edge face (and the second edge face).

The additional profile adhesively bonded to the insulating glazing unit is in particular a profile of a door of a piece of refrigerating equipment.

It is known to use an insulating glazing unit as the door of a piece of refrigerating equipment in which cold or frozen products are displayed, these products possibly being items of food or drinks or any other products that need to be kept cold—pharmaceutical products or even flowers for example. Such insulating glazing units consist of at least two glazing panes separated by a gas-filled cavity, at least one of the glazing panes being provided with a low-E coating.

When products kept in the piece of refrigerating equipment must remain visible, as is currently the case in many commercial premises, the piece of refrigerating equipment is equipped with glazed portions that transform it into a refrigerated "display", such "displays" commonly being referred to as "refrigerated display cabinets". There are a number of variants of these "displays". Certain take the form of cabinets and then it is the door itself that is transparent; others take the form of chests and it is the horizontal cover (door placed horizontally) that is glazed in order to allow its contents to be seen.

The first source (diodes on the first PCB carrier) may be fastened to the first glazing pane using the positioning profile. Better still, the second source (diodes on the second PCB carrier) may be fastened to the second glazing pane using the positioning profile.

Alternatively (or cumulatively), the first source (diodes on the first PCB carrier) may be fastened to the first edge face using adhesive means (as mentioned above), while being spaced apart from the positioning profile. This positioning profile may then provide protection from the mounting adhesive of the positioning profile and/or mechanical protection during the addition of the additional profile. Likewise, the second source (diodes on the second PCB carrier) may be fastened to the second edge face using adhesive means (as mentioned above), while being spaced apart from the positioning profile. This positioning profile may then provide protection from the mounting adhesive of the positioning profile and/or mechanical protection during the addition of the additional profile.

In order not to create a thermal bridge, if the fastening part is made of metal (like the bottom part and preferably the first lateral portion) it does not make contact both with the second glazing pane and the third glazing pane.

In order not to create a thermal bridge, preferably:
the first flange (preferably adhesively bonded by the often opaque mounting adhesive to the first exterior face above the first lateral portion) is made of a first material, preferably a metal, and the web is made of said first material in a first zone facing the first and second glazing panes and, in a second zone facing the third glazing pane, of a second material, the first material being securely fastened by adhesive bonding means to the second material;
and an optional second flange made of the second material extends over the second exterior face and is preferably adhesively bonded by the mounting adhesive to the second exterior face,
one of the first and second materials being a metal, the other being thermally insulating (a plastic).

In the absence of the second flange (or when the second flange is too short), the second exterior face may comprise means for masking the first seal (and the generally metal adhesively bonded spacer), these masking means preferably being made of a mineral material, such as an enamel, of optical density of at least 2 and even of at least 2.5.

For the material of the preferably black first seal (mechanically holding the glazing unit together and providing a seal against water) one of the following is preferably chosen:
(bi-component) polyurethane;
(bi-component) polysulfide;
silicone;
a (mono-component) hot-melt material.

The additional profile may be a frame preferably made up of a plurality of parts (that contain a right angle or abut, especially in the corners of the insulating glazing unit; are beveled; etc.).

The invention naturally also relates to a door of a piece of professional refrigerating equipment (cooled to a temperature above or below 0° C.) comprising a light-emitting glazing assembly such as described above and to a piece of refrigerating equipment comprising such a door.

If the door is a lid of a chest refrigerator in particular, the glazing units may be curved and thus it is preferable for the additional profile to be made of a flexible material in order to match the curvature.

Preferably, the first edge face is the first longitudinal edge of the multiple glazing unit (the second edge face being the same edge or the second longitudinal edge) and vertical after installation of the door.

The door preferably opens (outward from the piece of refrigerating equipment) and comprises for this purpose a pivot on top of the top additional profile.

In certain applications it is not always necessary to see the double illumination of the two sides or at least all of the double illumination. Thus, a reflective surface may make optical contact with the second exterior face, congruent with the first and/or second extracting features. It may be a question of a silvered layer on the second exterior face or an adhesively bonded reflective film.

The piece of refrigerating equipment may comprise two or more glazed doors.

Naturally, the insulating glazing unit may comprise a layer having a thermal function such as a low-E layer (silver-comprising multilayer and preferably a multilayer comprising a single silver layer), preferably on the third face in a double-glazing or triple-glazing version and even on the fifth face for the triple glazing unit.

In the commercial piece of refrigerating equipment door application, the first exterior face is preferably the main glazing face closest to the user (opposite the interior of the piece of equipment).

A profile for positioning, or even fastening to the multiple glazing unit, the first (and/or second) light source to the first (and/or second) edge face may be:
- rectangular (strip);
- or of T-shaped or U-shaped cross section;
- or better still of E-shaped cross section with the central arm of the E being distant (spaced apart) from the glazing assembly by less than 1 mm or even extending into a groove between the first and second glazing panes, in order to partition the light.

In a configuration where the first and second light sources are on opposite sides, the second glazing pane (being preferably of identical or similar size to the first glazing pane) projects beyond the first edge face forming a first projecting zone and preferably the first glazing pane projects beyond the second edge face forming a second projecting zone, and the first light source is on a first carrier that is attached to the first projecting zone and/or located in the first projecting zone and not projecting beyond the second edge face, and preferably the second light source is on a second carrier, which is attached to the second projecting zone and/or is located in the second projecting zone and not projecting beyond the first edge face.

The diode carrier at least (or even the chips) is provided, advantageously before it is integrated into the glazing unit (during manufacture thereof, etc.), with at least one mono or multilayer providing protection from moisture and/or an encapsulation such as a silicone, epoxy or acrylic lacquer.

More precisely, the protective layer protects at least a printed circuit board, solder joints and connectors if not sealed.

The diodes (at least the emitting face) are preferably not thus protected if already covered (pre-encapsulated) with silicone.

The strips of LEDs are protected before they are integrated into the housing. The protection may be a protective (silicone, epoxy, acrylic, etc.) lacquer or (silicone, epoxy, acrylic, etc.) encapsulation or "potting" of the strip of LEDs.

Mention may be made of the acrylic-, PU- or silicone-based conformal coatings sold by Syneo and the "Novec electronic coating EGC 1700" from 3M.

Mention may be made of the protective lacquer Abchimie. The deposition is by dip coating, selective deposition or vaporization (layers of 25-50 microns).

Preferably, the distance between the emitting face or emitting zone (which is optionally spaced apart from the edge face) and the injection edge face may be smaller than 2 mm.

The diodes may be (pre)encapsulated, i.e. comprising a semiconductor chip and a package (for example made of an epoxy resin or of PMMA) encapsulating the chip and the function of which is one of: scattering or focusing element, wavelength conversion. The package is shared or individual.

The diodes may preferably be single semiconductor chips that are for example about 100 µm or 1 mm in size.

The diodes may optionally comprise a (temporary or permanent) protective package for protecting the chip during handling or to improve the compatibility between the materials of the chip and other materials.

The diode may especially be chosen from at least one of the following light-emitting diodes:
- a side-emitting diode, i.e. emitting parallel to (the faces of) the electrical contacts, with an emitting face located to the side relative to the carrier; and
- a diode the main emission direction of which is perpendicular or oblique relative to the emitting face of the chip.

The diode carrier profile may be a conventional PCB or be made of metal.

The diode carrier profile may have a rectangular cross section.

The total number of diodes and the power of the diodes are chosen depending on the size and location of the zones to be illuminated, on the desired light intensity and on the uniformity required for the light.

The length of the diode carrier profile varies as a function of the number of diodes and of the extent of the area to be illuminated.

The means for extracting the guided light are scattering means located on the surface or in the bulk of the glazing pane in question.

To extract the light, scattering means are used, these means being formed either by a surface treatment of the glass sheet of sandblasting, acid etching or deposition of an enamel or scattering paste type, or by a treatment in the bulk of the glass, of laser etching type.

The scattering particles may be chosen from semi-transparent particles and preferably from mineral, particles such as oxides, nitrides, and carbides. The particles will preferably be chosen from the oxides of silica, of alumina, of zirconia, of titanium, of cerium, or from a mixture of at least two of these oxides.

For example, a scattering mineral layer of around 10 µm is chosen.

The distance from the emitting face and the first sheet may be smaller than 2 mm. In particular, diodes that are small in bulk may be used, for example chips without lenses and/or without pre-encapsulation, especially of width of about 1 mm, of length of about 2.8 mm and of height of about 1.5 mm.

The light of each source may be:
- continuous and/or intermittent,
- monochromatic and/or polychromatic.

The first extracting area (luminous zone) may extend from the first edge face, for example forming at least one band or feature. The second extracting area (luminous zone) may extend from the second edge face, for example forming at least one band or feature.

Together the first and second extracting areas may form a bi-colored luminous logo and/or a sign.

In one embodiment, the glazing assembly comprises:

a zone that is transparent right through the multiple glazing unit and therefore devoid of first and second extracting means (the first extracting area and the second extracting area partially covering the first and second glazing panes) and preferably the edge faces facing the transparent zone are devoid of light sources;

and/or the first extracting area is such that the glazing assembly is (remains) transparent overall (it is possible to see through the glazing unit), the extracting area for example being formed of features that are spaced apart by between 2 mm and 4 mm and of width of at most 5 cm, or 3 cm and even 5 mm (discrete features for uniform lighting for example).

The transparent zone and all of the transparent zones may occupy at least 20% or even at least 50% of the area of the first glazing pane.

Preferably the TL in the transparent zone is at least 85% and even at least 88%. The haze is preferably at most 2.5%.

It may (even in the absence of a transparent zone from which extracting features are therefore absent) be desirable for the size and spacing of certain or all of the first extracting features to be adjusted to obtain an overall transparency in all or some of the first extracting area. The size and spacing are adjusted depending on the extent of the first extracting area containing these first features.

It may in addition be desirable for the size and spacing of certain or all of the second extracting features to be adjusted to obtain an overall transparency in all or some of the second extracting area.

The edge face opposite the first edge face may be polished (and straight) or scattering. The edge face opposite the second edge face may be polished or scattering. Preferably, for an application in which the opposite edge faces are visible (no mounting or fastening profile masking them), the first and second edge faces are on the same side of the glazing assembly and are even aligned and the opposite edge faces are even not optically coupled.

The glazing assembly may in particular comprise:

a third light source identical to the first light source and facing the latter, said third light source being synchronized with the first source and (preferably) being controlled dynamically, on the edge face opposite the first edge face, especially if the first extracting area has a characteristic dimension along the propagation axis of the light of at least 450 mm (extending away from the first source);

and preferably comprises a fourth light source identical to the second light source and facing the latter, said fourth light source being synchronized with the second source and preferably being controlled dynamically, on the edge face opposite the second edge face, especially if the second extracting area has a characteristic dimension along the propagation axis of the light of at least 450 mm (extending away from the second source).

In the latter case, like the first source the third source is preferably hidden by a profile and, if relevant, like the second source the fourth source is hidden by a profile.

In particular, the glazing assembly comprises a mounting frame, for example a profile that is made of metal or (rigid) plastic, of polyvinyl chloride (PVC) or wood and/or that has a U-shaped cross section and the light sources are located in the internal volume between the mounting frame and the edge faces on the two vertical struts fastened to the frame or fastened to the glazing pane via the edge face (by a fastening profile for example).

The extracting areas may be various shapes and sizes. The first extracting area may comprise a single, preferably scattering, feature that is for example unapertured, closed and even apertured or like a ring. In the hollow (aperture) the first optical isolator preferably faces the internal face.

The scattering extracting features are for example geometric shapes: rectilinear or curved band, concentric circles, L shapes, etc. The features are identical or different, parallel to each other or not and may be separated by an identical distance or not.

To extract the light, scattering means are preferably used, these means being formed either by a treatment, such as sandblasting, acid etching, deposition of an enamel or scattering paste, of the surface of the glass, or by a treatment of the laser etching type of the bulk of the glass.

To extract the light, scattering means are used, these means for example being formed either by a treatment, such as sandblasting, acid etching, deposition of an enamel or scattering paste or paint, of the surface of the glass sheet, or by a treatment of the laser etching type of the bulk of the glass.

According to one feature, the first (and/or second) extracting means are a white scattering layer, especially an enamel or a paint, having a lightness $L^*$ of at least 50. The color is defined in a known way by the parameters $L^*$, $a^*$ and $b^*$ and is measured by a spectrocolorimeter.

The optical density of a scattering layer (enamel, paint, ink, etc.), especially of a white scattering layer, for the first and/or second extracting means, may be lower than 2.5 to 2, even lower than 1.5 or even lower than 1.

The, especially enamel, scattering layer may be a continuous surface layer of width smaller than 200 mm, even than 100 mm and even more preferably smaller than or equal to 50 mm, or be discontinuous and formed from an assembly of thin features.

In one preferred embodiment, the scattering layer (all or some of the extracting means) consists of agglomerated particles in a binder, said particles having a mean diameter of between 0.3 and 2 microns, said binder being in a proportion of between 10% and 40% by volume and the particles forming aggregates the size of which is between 0.5 and 5 microns. This preferred scattering layer is particularly described in patent application WO 01/90787.

The particles may be chosen from semi-transparent particles and preferably from mineral particles such as oxides, nitrides, and carbides. The particles will preferably be chosen from the oxides of silica, of alumina, of zirconia, of titanium, of cerium, or from a mixture of at least two of these oxides.

According to one characteristic, the extracting enamel has the following composition:

between 20% and 60% by weight of $SiO_2$,

10% to 45% by weight of especially micron-sized refractory pigments, especially of $TiO_2$; and preferably no more than 20% by weight of alumina and/or zinc oxide.

The $TiO_2$ pigments make the enamel sufficiently opaque (that the enamel can be seen in the off-state) and lower the TL. Examples of extracting enamel compositions include the enamel called Ferro 194011 sold by FERRO, the enamel of reference AF5000 sold by JM and the enamel of reference VV30-244-1 sold by Pemco, which are very white, with a brightness higher than 20, and have a low light transmission—lower than 40%.

Preferably, it is a question of a plurality of preferably scattering features (preferably formed by a discontinuous scattering layer).

The first extracting means may, as seen above, be an assembly of scattering features referred to as a scattering array, especially for a luminous zone of large size that it is desired to make as uniform as possible.

Preferably, the first (second, respectively) glazing pane coated with the first (second, respectively) especially enamel, scattering extracting means has a light transmission lower than 45%, even than 40% or even than 35% on the first-face (second-face, respectively) side.

The, especially enamel, first extracting means for example extend over the entirety of one face of the glass sheet discontinuously or in the form of sparse geometric shapes arranged along curved and/or straight lines. The extracting means for example have a fractal geometry.

According to another feature, the first extracting means extend discontinuously and bound dark zones, especially sparse features of geometric shape arranged along curved and/or straight lines, especially of at least centimeter-sized length (larger dimension).

The first features, which are either identical or different, are for example hollow, graphics, letters (with diacritical marks), numbers, alphanumeric symbols, punctuation marks and/or symbols arranged to form a frame and/or band.

The first extracting area may have a straight or curved outline, be a geometric shape (rectangle), be smaller in width than the first glazing pane and have a height or length (along the first edge face) smaller than the height or length of the first glazing pane.

The same goes for the second extracting area.

Preferably, the first glazing pane (like the second glazing pane) is rectangular and its width lies perpendicular to the ground once mounted.

The first extracting area may comprise:
- a first array of discrete scattering features, especially geometric features (square, circles, etc.) especially of the same shape, of width $I_1$ (width along the propagation axis of the light) that is optionally variable (getting larger with distance from the first source if there is no light source opposite) and at most 1 cm, better still at most 5 mm and even at most 2.5 mm, said features being spaced apart by a pitch pi that is optionally variable (getting smaller with distance from the first source if there is no light source opposite) and at most 1 cm and better still at most 5 mm, the pitch and width of said features especially being adapted to obtain an overall transparency (in the sense that it is possible to see through the first glazing pane in this first extracting area);
- and/or a first scattering decorative feature of centimeter-sized width $I_2$ (width along the propagation axis of the light) of at most 5 cm, better still at most preferably encircled by (even interlaced with) the first array;
- and/or a first scattering assembly of characters, such as a logo and/or such as letters and/or numbers, each of centimeter-sized width $I_3$ (width along the propagation axis X of the light) of at most 5 cm, better still at most spaced apart by a pitch $p_3$ of at most 1 cm, better still of at most 5 mm and preferably encircled by the first array of discrete scattering features.

The offset second extracting area may comprise:
- a second array of discrete scattering features, especially geometric features (square, circles, etc.) especially of the same shape, of width $I'_1$ (width along the propagation axis of the light) that is optionally variable (getting smaller with distance from the second source if there is no source opposite) and at most 1 cm, better still at most 5 mm and even at most 2.5 mm, said features being spaced apart by a pitch $p'_1$ that is optionally variable (getting larger with distance from the second source if there is no source opposite) and at most 1 cm, better still at most 5 mm, the pitch and width of said features especially being adapted to obtain an overall transparency (in the sense that it is possible to see through the second glazing pane in this second extracting area);
- and/or a second scattering decorative feature of centimeter-sized width $I'_2$ (width along the propagation axis of the light) of at most 5 cm and preferably encircled by (even interlaced with) the second array;
- and/or a second scattering assembly of characters, such as a logo and/or such as letters and/or numbers, each of centimeter-sized width $I'_3$ (width along the propagation axis X of the light) of at most 5 cm spaced apart by a pitch $p'_3$ of at most 1 cm, even of at most 5 mm and preferably encircled by the second array of discrete scattering features.

By way of a light source different from an assembly of diodes it is possible to choose an extracting optical fiber having a lateral emitting face (coupled to a primary light source that is typically a diode). For example the optical fiber called 3M™ Precision Lighting Elements sold by 3M is used.

It may in particular be chosen to make the first lamination interlayer and better still all the lamination interlayers from thermoplastic sheets made of ethylene vinyl acetate (EVA) or even polyurethane (PU) or polyvinyl butyral (PVB). Such sheets are preferably made of multi- or single-component resins that are either heat-curable (epoxy, PU) or UV-curable (epoxy, acrylic resin).

The first lamination interlayer is for example submillimeter-sized and made of one or more assembled sheets. The first lamination interlayer (and better still all the lamination interlayers) may be clear or extra clear and have a neutral color.

The first lamination interlayer is preferably made from EVA or PVB. Preferably, each lamination interlayer has a haze (measured in the conventional way with a haze meter) of at most 1.5% and even of at most 1%, as for example is the case for EVA or PVB interlayers. This decreases the, amount of scattering between the extracting features, in the transparent zone(s). For EVA or PVB n3 (n'3) is typically about 1.49.

The first (and preferably the second) optical isolator is preferably a flat element (or an element following the curvature of the first glazing pane). It may preferably be continuous but may be made of a number of sections of the same material or even different materials.

The first optical isolator (the second optical isolator, respectively) may be an added element (film) or a deposited layer (a deposit).

In a first embodiment, the first optical isolator according to the invention comprises (better still consists of) a first film based on a fluoropolymer and better still made of a fluoropolymer, especially of thickness e2 of at least 600 nm and better still of a micron size and even of at least 10 μm or 50 μm. Preferably, the second optical isolator according to the invention comprises (better still consists of) another film based on a fluoropolymer and preferably made of a fluoropolymer, especially of thickness e'2 of at least 600 nm and better still of a micron size and even of at least 10 μm or 50 μm, and identical to the first fluoropolymer film.

The low-index fluoropolymer film is simple to implement, enables design flexibility (the film simply being cut) and can be used for assemblies of any (including large) size.

The first lamination interlayer, which is preferably made of EVA, provides the first film with enough mechanical strength that a satisfactory optical contact is obtained.

In the final product, the low-index fluoropolymer film (assembled via the first interlayer) is preferably not a fluoropolymer layer or deposit deposited by wet processing. A fluoropolymer layer requires special solvents to be used and it may be very problematic to get it to adhere.

For the lamination, a conventional thermal cycle may be used and even better still that used for the laminated glazing unit enclosing plastic films (polyethylene terephthalate (PET) etc.).

Preferably, n2 may be less than or equal to 1.45 or even less than or equal to 1.4.

The first optical isolator preferably consists of the first low-index film.

For the sake of simplicity, the first low-index film extends over all of the first lamination interlayer that itself extends over substantially all of the first glazing pane though it is possibly recessed from the first edge face, for example being absent from the aforementioned anti-mixing zone.

Preferably, the first lamination interlayer (and even the first low-index film) is recessed from the first edge face, leaving a peripheral zone (or band) free i.e. in contact with the air. The carrier of the first light source (especially a PCB or a PCB carrier) may be arranged facing this peripheral zone.

The first fluoropolymer film (and possibly the second) may be based on or even made of one of the following materials:
- perfluoroalkoxy (PFA), especially of n2 of about 1.3;
- polyvinylidene fluoride (PVDF), especially of n2 of about 1.4;
- ethylene chlorotrifluoroethylene (ECTFE);
- ethylene tetrafluoroethylene (ETFE), more precisely poly(ethylene-co-tetrafluoroethylene), especially of n2 of about 1.4;
- fluorinated ethylene propylene (FEP), especially of n2 of about 1.3; and
- polytetrafluoroethylene (PTFE), especially of n2 of about 1.3, but which is the most difficult to laminate.

ETFE is preferred because it is the easiest to laminate to the thermoplastic first lamination interlayer. It preferably has a haze of at most 2%. FEP may be preferred for its lower refractive index or lower haze of at most 2% as it provides an acceptable lamination performance.

Polysiloxanes are other low-index materials, but their mechanical properties are unsatisfactory.

Fluoropolymer films are widely available above 50 μm.

To obtain a better assembly with the glass, the main surfaces of the first low-index film may be treated with an adhesion-promoting surface treatment, preferably a corona treatment.

If the second optical isolator is distinct from the first, an identical or similar low-index film is also preferably chosen.

In one preferred embodiment, a zone containing first and second extracting areas may comprise, through the thickness of the glazing assembly, the following sequence:
first glazing pane/first scattering means formed from a scattering layer/first lamination interlayer (preferably made of EVA)/first optical isolator formed from a low-index film/second lamination interlayer (preferably made of EVA)/second extracting means formed from a, scattering layer offset from the first extracting means/second glazing pane,
the first and second light sources, better still assemblies of diodes, in particular even being on the same side (the first and second edge faces even being aligned).

In another optical-isolator embodiment according to the invention, the first optical isolator comprises (better still consists of) a first porous silica layer of thickness e2 of at least 400 nm, located on a main face of another transparent glazing pane made of mineral glass, said face being oriented to the internal-face side.

Furthermore, the second optical isolator may preferably comprise (better still consist of) a second porous silica layer of thickness e'2 (of at least 400 nm).

The first optical isolator may comprise, on one main face of another transparent glazing pane that is made of mineral glass, said face being oriented to the internal-face side, a first porous silica layer of thickness e2 of at least 400 nm, which layer is preferably coated with a first transparent and mineral protective coating that is preferably a silica layer of thickness e4 larger than 50 nm and preferably larger than 100 nm having a refractive index n4 of at least 1.4 at 550 nm. Furthermore, the glazing assembly may also comprise, on another main face of the other glazing pane, said face being oriented to the bonding-face side, a second porous silica layer of thickness e'2 of at least 400 nm, forming the second optical isolator, which layer is coated with a second transparent and mineral protective coating that is preferably a silica layer of thickness e'4 larger than 50 nm and preferably larger than 100 nm having a refractive index n'4 of at least 1.4 at 550 nm.

n2 (in all the visible spectrum) may be at most 1.35, preferably at most 1.25 and even lower than 1.2. The same goes for n'2.

It is possible to use only the first porous sol-gel layer (preferably) with its protective coating, but in light of the—especially millimeter-sized—thickness of the other "central" glass sheet, the path length of the guided rays is increased and this may decrease extraction efficiency.

Document WO 2008/059170 proposes the use of a porous low-index layer as an optical isolator in a diode-comprising illuminating laminated glazing unit. This layer optically isolates the first glazing pane from the tinted outermost second glazing pane. The manufacturing conditions described may be reused, adjusting for e2 (e'2).

For an optical isolation taking account of skin depth, preferably:
- when n2 (n'2) is lower than or equal to 1.3, e2 (e'2) is at least 600 nm;
- when n2 (n'2) is lower than or equal to 1.25, e2 (e'2) is at least 500 nm; and
- when n2 (n'2) is lower than or equal to 1.2, e2 (e'2) is at least 400 nm.

To be certain, e2 (e'2) is chosen to be at least 600 nm and even at least 700 nm or even at least 800 nm.

The porous silica layer may be a compact stack of silica nanoparticles, for example obtained by the sol-gel process, or preferably a silica layer comprising a silica matrix (also referred to as a silica network) containing pores and preferably obtained by the sol-gel process. Very particularly, a porous layer comprising an (essentially) continuous solid phase, thus forming dense pore walls, is preferred to a solid phase mainly taking the form of (nano)particles or crystallites.

There are various pore-forming agents that may be used to manufacture the porous sol-gel layer. Thus, document EP 1 329 433 discloses a porous silica layer produced from a tetraethoxysilane (TEOS) sol hydrolyzed in an acid medium with a pore-forming agent based on polyethylene glycol tert phenyl ether (referred to as Triton) at a concentration between 5 and 50 g/l. The combustion of this pore-forming agent at 500° C. releases the pores. This non-localized pore-forming agent is of indeterminate form and spreads uncontrollably through the structure.

Other pore-forming agents are known, such as micelles of cationic surfactant molecules in solution, and optionally in hydrolyzed form, or micelles of anionic or nonionic surfactants, or of amphiphilic molecules, for example block copolymers. Such agents generate pores in the form of narrow channels or relatively round pores of small size between 2 and 5 nm.

Preferably, the porous silica layer is obtained with a particular pore-forming agent, such as polymer beads, that for its part makes it possible to obtain better control of the size of the pores, especially allowing large pore sizes to be obtained, better control of the organization of the pores, especially allowing a uniform distribution to be obtained, as well as better control of the number of pores in the layer and better reproducibility. The polymer beads may have a polymer core and a mineral shell.

The smallest characteristic dimension of the pores may even more preferably be greater than or equal to 30 nm and preferably less than 120 nm, better still less than 100 nm. Furthermore, also preferably, the largest characteristic dimension of the pores may even more preferably be greater than or equal to 30 nm and preferably less than 120 nm, better still less than 100 nm.

The aspect ratio, the largest dimension divided by the smallest dimension, may be less than 2 and even less than 1.5.

In one preferred embodiment, the porous silica layer is a matrix of silica having closed pores (preferably bounded by walls made of the silica) in its volume, and in particular an open porosity on its surface, the closed pores, which especially have a substantially oval or substantially spherical shape, each having a smallest dimension of at least 30 nm and a largest dimension of at most 120 nm and preferably between 75 nm and 100 nm.

The porous layer containing closed pores in its volume is mechanically stable; it does not collapse even for high pore concentrations. The pores may easily be separated from one another, even individualized.

The pores may be elongate, especially shaped like a grain of rice. Even more preferably, the pores may have a substantially spherical or oval shape. Preferably, most of the closed pores, even at least 80% thereof, have a given substantially identical, especially elongate, substantially spherical or oval shape.

Most (even between 80% or even 95% or better still all) of the closed pores may preferably have a smallest characteristic dimension, and preferably also a largest dimension, of between 75 and 100 nm.

In the porous layer, the pores may be of different sizes, even though this is not preferred.

The porosity may furthermore be monodisperse in size, the pore size then being set at a minimum value of 30 nm, preferably 40 nm and even more preferably 50 nm, and preferably less than 120 nm.

The fraction of pores per unit volume may preferably be higher than 50% and even than 65% but is preferably lower than 85%.

However, it will be noted that the maximum volume fraction of 74% is the maximum theoretical value applied to a stack of spheres of identical size, whatever it may be.

The Applicant has observed that when the first porous silica layer is applied (directly) to the first lamination interlayer its function as an optical isolator is affected. It is probable that the pores of the porous layer, in particular the open pores on its surface, are polluted in the course of manufacture and that the pollutants remain trapped in the pores even after a heat treatment (lamination heat treatment).

Thus, advantageously, the first porous silica layer is coated with a first transparent and mineral protective coating that is preferably a silica layer of thickness e4 larger than 50 nm and preferably larger than 100 nm and even than 180 nm, having a refractive index n4 of at least 1.4 at 550 nm (and better still at $\lambda 1$, $\lambda 2$, $\lambda 3$, $\lambda 4$ and even in all the visible).

The transparency of the protective coating in particular allows it to be seen through.

During trials, the Applicant observed that with a thickness of less than 50 nm the barrier presented to pollutants by the porous silica layer was sometimes unsatisfactory.

The dense silica layer comprises an (essentially) continuous solid phase rather than a solid phase mainly taking the form of (nano)particles or crystallites.

A dense silica layer (especially one not intentionally made porous) conventionally has a refractive index at 550 nm of about 1.45 if deposited by physical vapor deposition, and between 1.42 and 1.46 if obtained by the sol-gel process.

The glazing pane with the sol-gel layer (and the protective coating) may have been given a heat treatment at a temperature of 450° C. or more, preferably of 600° C. or more, and is especially even a pane of tempered glass or tempered/curved glass.

The porous silica (and the protective coating) may be mineral or even a mineral/organic hybrid. The silica may be doped. The dopant elements may preferably be chosen from Al, Zr, B, Sn, Zn. The dopant is introduced to replace Si atoms in a molar percentage possibly and preferably reaching 10% and even more preferably as high as 5%.

The first (second) porous silica layer may be a sol-gel layer and the first (second) protective coating a silica sol-gel layer.

The manufacture of a porous silica layer, acting as an optical isolator between a guiding glass pane and a tinted glass pane of a luminous laminated glazing unit, is described in patent application WO 2008/059170.

In one preferred embodiment, a zone containing first and second extracting areas may comprise, through the thickness of the glazing assembly, the following sequence:

first glazing pane/first scattering means (features) formed from a scattering layer/first lamination interlayer (preferably made of PVB)/(first protective coating (silica layer))/first optical isolator formed from a porous silica layer/another (especially thin) pane called the "central" pane/second optical isolator formed from a porous silica layer/(second protective coating (silica layer))/second lamination interlayer (preferably made of PVB)/second extracting means formed from a scattering layer offset from the first extracting means/second glazing pane.

The first (exterior) face is preferably free (of coatings, coverings) except optionally the first extracting means (second extracting means, respectively).

According to the invention the expression "glazing pane" is understood to mean a monolithic glass sheet.

Preferably, the first glazing pane, made of tempered mineral glass, is from 4 to 6.5 mm in thickness and the second glazing pane, made of tempered mineral glass, is from 4 to 6.5 mm in thickness, these two thicknesses in particular being identical. When the first (second, respectively) extracting means are made of enamel, the bake used to form the enamel may be followed by the (only) tempering operation.

The second glazing pane may also be made of a (preferably rigid or semi-rigid) organic glass such as polymethyl methacrylate (PMMA)—preferably with a PU lamination interlayer—or polycarbonate (PC)—preferably with a PVB lamination interlayer.

The first (second) glazing pane may be any type of flat (or optionally curved) glass (the glass, when it is a question of coating curved surfaces, being bent by bending processes known to those skilled in the art). It is a question of monolithic glass panes, i.e. panes composed of a single sheet of mineral glass, which may be produced by the float process, allowing a perfectly flat and smooth sheet to be obtained, or by drawing or rolling processes.

By way of example of glazing materials, mention may be made of float glass, optionally chemically or thermally hardened or tempered, having a conventional soda-lime composition, an aluminum borosilicate, sodium borosilicate or any other composition.

The glass of the first and second glazing panes may be clear or extra-clear, containing very small quantities of iron oxide(s). It is for example a question of the glass panes sold in the "DIAMANT" range by SAINT-GOBAIN GLASS.

A glazing pane made of, especially extra-clear, soda-lime-silica glass may be chosen for the first and second glazing panes, possibly exhibiting:
 a transmission of the light radiation of greater than or equal to 91%, or even greater than or equal to 92% or even 93% or 94% at 550 nm or preferably in the entire visible range;
 and/or a reflection of the light radiation of less than or equal to 7%, or even less than or equal to 4% at 550 nm or preferably in the entire visible range.

Each optically coupled edge face may be worked, especially straight and polished.

The glass may have been given a heat treatment at a temperature of 450° C. or more, preferably of 600° C. or more, and is especially even a pane of tempered or tempered/curved glass.

The thickness of the first glazing pane is preferably comprised between 2 and 19 mm, preferably between 4 and 10 mm and more particularly between 5 and 9 mm. The thickness of the second glazing pane is preferably comprised between 2 and 19 mm, preferably between 4 and 10 mm and more particularly between 5 and 9 mm. It may be preferable for the thicknesses of the two glass panes to be equal.

The thickness of said optional other glazing pane (laminated to the first and second panes) is preferably comprised between 2 and 19 mm and preferably between 2 and 4 mm. It may be preferable for the three glass panes to have equal (and even smaller than with two glass panes) thicknesses, for example about 4 mm/about 4 mm/about 4 mm.

The thickness of said optional third glazing pane (double insulating glazing unit) is preferably comprised between 2 and 19 mm and preferably between 2 and 4 mm. It may be preferable for the three glass sheets to have equal (and even smaller than with two glass sheets) thicknesses, for example about 4 mm/about 4 mm/about 4 mm.

The second (third) glazing pane may preferably be of identical size to the first.

For the first (said other, second and even third, respectively) mineral glass glazing pane, n1 (n'1, n"1) is typically 1.50 to 1.53.

Naturally, the first glazing pane may contain a plurality of first extracting areas, especially in horizontal or vertical bands, preferably spaced apart by at least 2 cm, 5 cm, even at least 10 cm, preferably in order to leave a transparent zone (also with no second extracting area) in the glazing area (outside a peripheral mounting, anti-mixing or hotspot zone).

Naturally, the second glazing pane may contain a plurality of second extracting areas, in horizontal or vertical bands, spaced apart by at least 5 cm or 10 cm, preferably in order to leave a transparent zone (no second extracting area) in the glazing area (outside a peripheral mounting, anti-mixing or hotspot zone).

Preferably if the second extracting area contains a plurality of extracting features (scattering features formed by a discontinuous, especially white, layer, etc.) the maximum distance between neighboring features (discrete features, characters, decorations, etc.) is at most 1 cm and even at most 0.5 mm.

Preferably:
 the first (second, respectively) extracting area has a width of at least 3 cm, 5 cm or even 10 cm;
 the first (second, respectively) extracting area has an area of at least 25 cm$^2$ (5×5 cm$^2$) or even of at least 100 cm$^2$ (10×10 cm$^2$), and is of a size that can be seen from a distance of at least 1 m or even 2 m or 10 m;
 and/or the first (second, respectively) extracting area has an overall transparency (it is possible to see through the glazing assembly), containing features preferably having a pitch ranging from 2 mm to 4 mm.

To form the first and/or second extracting features a preferably white scattering layer defined by a lightness L* of at least 50 is chosen. Preferably, the scattering layer contains a mineral pigment chosen such that it is white in color. This pigment is especially titanium oxide $TiO_2$. Advantageously, this white mineral pigment has a lightness L* such as defined in the CIE Lab (1931) color space that ranges from 65 to 85, measured on the first glazing pane.

The lightness L* may be measured under the conditions described in the CIE (1931) protocol using a $D_{65}$ illuminant, an observer at 10°, in SCE mode (specular component excluded) diffuse 8° (CM 600 Minolta).

The glass frit of the scattering layer is free from lead oxide PbO for reasons related to protection of the environment.

Details and advantageous features of the invention will now become clear from the following nonlimiting examples, and by way of the figures:

FIGS. 1, 1', 1", 2", 2a to 2f, 2'a, 2'b, 3, 3", 4, 5a, 5'a and 5b are (sometimes partial) schematic cross-sectional views of luminous glazing assemblies comprising two-colored features in a number of embodiments of the invention; and FIGS. 1a to 1e, 1'a, 1"a to 1"e are (sometimes partial) schematic front views of luminous glazing assemblies comprising two-colored features in a number of embodiments of the invention.

The figures are not to scale.

EXAMPLES

FIG. 1 shows in greater detail a cross-sectional view of a glazing assembly 100 comprising two luminous zones of different colors in a first embodiment, comprising:
 a first glazing pane 1, here rectangular (length along the vertical for example, and width of 250 mm for example) that is flat, or as a variant curved (tempered), made of tempered clear or extra-clear soda-lime-silica glass (for example of about 6 mm in thickness, especially the glass called Diamant from the Applicant) of refractive index n1 of about 1.5 at 550 nm and with a $T_L$ of at least 90%, comprising a main face 11 called the internal face, an opposite main face 12 called the first face, here the exterior face, and a first edge face 13 that is vertical in the mounted position and its opposite edge face 14 (here the edge is formed by four edge faces, the first edge face being longitudinal);

a first light source 4, here a first assembly of red and green light-emitting diodes 4 aligned on a printed circuit board called the first PCB carrier 41, said source being optically coupled to the first edge face 13, the first glazing pane 1 guiding the light emitted by the diodes that are here preferably spaced apart from the first edge face 13 by at most 1 mm, said source preferably being centered on the first edge face and of width smaller than the thickness of the first glazing pane 1, for example each diode having a width W0 of 4 mm; and a first extracting area 50 defined by first light-extracting features 5, 5a associated with the first glazing pane, here (directly) on the internal face 11, which features are a first discontinuous white scattering layer having a lightness L* of at least 50, which layer is here a white scattering enamel containing white mineral pigments and fused glass frit, taking the form of first scattering features of any size (width and/or length); here for example the area is an array of decorative, for example geometric, features 5a, 5 of 3 cm width, and/or as a variant of discrete for example geometric features such as disks especially adapted to provide an overall transparency.

The first scattering feature 5a closest to the first edge face 13 is distant by W from the first edge face 13.

The first features 5 may alternatively or cumulatively be on the first face 12.

In a first example manufacturing procedure, to form the field of the first scattering features 5, 5a, a first liquid scattering enamel composition comprising a glass frit, a white mineral pigment and an organic medium is applied discontinuously by screen-printing to the internal face 11 (or as a variant to the first face 12) and dried and the assembly is then baked.

More precisely, the first enamel composition contains a glass frit and $TiO_2$ pigments (sold under the reference 194100 by FERRO) and an organic medium (sold under the reference 801022 by Prince Minerals) in an amount allowing a viscosity of 200 poise (measured under the aforementioned conditions) to be obtained. The average thickness (when wet) of the deposited first layer is equal to 35 μm.

As a variant, the white scattering enamel for example has the following composition:
- between 20% and 60% by weight of $SiO_2$,
- 10% to 45% by weight of especially micron-sized refractory pigments, including $TiO_2$, and
- no more than 20% by weight of alumina and/or zinc oxide.

Examples of enamel compositions include the enamel called Ferro 194011 sold by FERRO, the enamel of reference AF5000 sold by JM and the enamel of reference VV30-244-1 sold by Pemco.

Instead of an enamel, a white paint may be used. Mention may be made by way of example of the paint Extrablanc of the range Planilaque Evolution from the Applicant, $TiO_2$ being the predominant pigment. The thickness is typically between 40 and 60 μm. A paint formulation may be deposited using a curtain process. The solvent is xylene or as a variant water. After it has been dried, the lacquer for example contains the following ingredients:

- a binder in the form of a polyurethane resin obtained by crosslinking, with a non-aromatic isocyanate, of hydroxylated acrylic resins resulting from the polymerization of an acrylic styrene; and
- mineral materials (pigments and fillers) in an amount of 55% by weight.

The internal face 11 and the first features 5 above are (directly) covered by:
- a first lamination interlayer 3 made of a transparent, even clear, submillimeter-sized 0.38 mm sheet of thermoplastic, here EVA, having (alone) a haze of at most 1.5%, and even 1% and a refractive index n3 such that, in absolute value, n3-n1 is lower than 0.05 in the visible spectrum (here n3 equals about 1.49);
- a 50 μm-thick low-index fluoropolymer, preferably ETFE or FEP, film 2 forming the first (and here only) optical isolator, having first and second main faces 21, 22 treated by a corona treatment and a haze between 1.5 and 2%, such as the product called Norton ETFE from Saint Gobain Performance Plastics, which has a refractive index n2 equal to 1.4, or the product Norton FEP from Saint Gobain Performance Plastics, which has a refractive index n2 equal to about 1.34, this film 2 making adhesive contact with the first lamination interlayer 3 via its face 21;
- a second lamination interlayer 3' made of a transparent, clear thermoplastic, preferably EVA, identical (nature, thickness, a sheet) to the first lamination interlayer and making adhesive contact with the face 22 of the low-index film 2, and of refractive index n'3; and
- a second mineral glass glazing pane 1' that is identical to, congruent and in coincidence with the first glazing pane, having a main bonding face 11' on the same side as the second lamination interlayer 3', an opposite face called the second face 12', a second edge face 13' and its opposite edge face 14', of refractive index n'1 of about 1.5 at 550 nm, of a $T_L$ of at least 90% and with an n'3 such that, in absolute value, n'3-n'1 is lower than 0.05 in the visible spectrum (here n'3 is equal to about 1.49).

Therefore here the glazing assembly 100 comprises a multiple glazing unit that is a laminated glazing unit having first and second faces that are the exterior faces.

The glazing assembly 100 furthermore comprises:
- a second light source 4', here a second assembly of red and green light-emitting diodes aligned on a printed circuit board called the second PCB carrier 41', said source being optically coupled to the second edge face 13', the second glazing pane 1' guiding the light emitted by these diodes 4', which are preferably distant (spaced apart here) from the second edge face by at most 1 mm, said source preferably being centered on the second edge face and of width smaller than the thickness of the second glazing pane 1', for example each diode having a width W'0 of 4 mm; and
- second light-extracting means 5' associated with the second glazing pane and defining a second extracting area 50' here (directly) on the bonding face 12', which means 5' are a second discontinuous white scattering layer having a lightness L* of at least 50, preferably a white scattering enamel containing white mineral pigments and fused glass frit, this layer here being of (substantially) identical nature and thickness to the first scattering layer 5, and taking the form of second scattering features 5' that are offset (and here even spaced apart) from the first features and chosen from one or more decorative features, an array of discrete features adapted to provide an overall transparency and/or an array of characters, the second features here being decorative.

To dissipate heat, the PCB carriers 41, 41' are adhesively bonded with thermal adhesive 18' to the metal profile 7.

The manufacture of the second glazing pane thus coated with a scattering white enamel layer is the same as was described for the first glazing pane.

Between the features 5, 5' (transparent zone 15) the glazing assembly 100 is transparent with a $T_L$ of at least 85%. Between the first (second, respectively) edge face and the first feature 5 (5', respectively) there is a zone 16 that here is also transparent.

Table III below gives examples of $T_L$s and hazes for the transparent zone (first-face side) as a function of the about 0.38 mm-thick EVA chosen.

TABLE III

| EVA | Haze (%) | $T_L$ (%) |
|---|---|---|
| HDPE from CNC | | |
| EVASafe039 from Bridgestone | | |

Haze is measured with a haze meter.

Each interlayer is preferably a single sheet to decrease haze.

Alternatively, with two of the PVB sheets denoted RB41 sold by Solutia, which have a haze of less than 1.5%, in the transparent zone (first-face side 12) the $T_L$ is 87% and the haze about 2.5%.

The first light source 4 is therefore controlled dynamically to emit at the instant t0, via a first series of diodes 4, a first main emission at a first wavelength called λ1, and optionally, in a dynamic mode, at the instant t'≠t0, via a second series of diodes 4, a second main emission at a second wavelength called λ2 distinct from λ1.

The second light source 4' is therefore controlled dynamically to emit at the instant t0, via a third series of diodes 4', a third main emission at a third wavelength called λ3, distinct from λ1, and preferably, in a dynamic mode, at the instant t'≠t0, via a fourth series of diodes 4', a fourth main emission at a fourth wavelength called λ4 distinct from λ3.

By way of example, with two switchable colors, red and green, for each source 4, 4' at t0:

the first source 4 emits in the green with λ1 in a range extending from 515 nm to 535 nm and of spectral width at half-maximum of less than 50 nm (and the light extracted C1 is green defined by a first main emission extracted at λ1' substantially equal to λ1, distinct by at most 10 nm or at most 5 nm and with a spectral width at half-maximum of less than 30 nm); and the second source 4' emits in the red with λ3 in a range extending from 615 nm to 635 nm and of spectral width at half-maximum of less than 30 nm (and the light extracted C3 is red defined by a third main emission extracted at λ3' substantially equal to λ3, distinct by at most 10 nm or at most 5 nm and with a spectral width at half-maximum of less than 30 nm), or even in the white.

And at t':

the first source emits in the red with λ2 in a range extending from 615 nm to 635 nm and of spectral width at half-maximum of less than 30 nm (and the light extracted C2 is red defined by a second main emission extracted at λ1' substantially equal to λ1, distinct by at most 10 nm or at most 5 nm and with a spectral width at half-maximum of less than 30 nm); and the second source emits in the green with λ4 in a range extending from 515 nm to 535 nm and of spectral width at half-maximum of less than 50 nm (and the light extracted C4 is green defined by a fourth main emission extracted at λ4' substantially equal to λ4, distinct by at most 10 nm or at most 5 nm and with a spectral width at half-maximum of less than 30 nm).

Alternatively, the first source continues to emit in the red with λ4 in a range extending from 615 nm to 635 nm and of spectral width at half-maximum of less than 30 nm (and the light extracted C4 is red defined by a fourth main emission extracted at λ4' substantially equal to λ1, for example distinct by at most 10 nm or at most 5 nm and preferably with a spectral width at half-maximum of less than 30 nm).

In another configuration, for example, at t3 each source 4, 4' emits in the green or in the white. It is also possible for one of the sources to be turned off (therefore creating the following configurations: red and off-state; green and off-state; white and off-state, etc.).

To prevent the mixing of the green and red colors in the second extracting area, each diode 4 of the first source 4 comprises collimating optics 42 that ensure a narrow emission pattern. Each diode 4 of the first light source 4 is spaced apart from the first edge face 13 by at most 1 mm (or less) of air and at least 80% (better still at least 90% and even at least 95%) of the light flux emitted by each diode is in an emission cone between −α1 and α1 where 01=arcsin(n1*sin(α2)) and where α2=π/2−arcsin(n2/n1) corresponds to the angle of refraction in the first glazing pane, as shown by the detail view.

To prevent the mixing of the green and red colors in the first extracting area, each diode of the second source 4 comprises collimating optics 42' that ensure a narrow emission pattern. Each diode 4' of the second light source 4' is spaced apart from the second edge face 13' by about 1 mm (or less) of air and at least 80% (better still at least 90% and even at least 95%) of the light flux emitted by each diode is in an emission cone between −α'1 and α'1 where α'1=arcsin(n1*sin (α'2)), and where α'2=/2−arcsin(n2/n'1) corresponds to the angle of refraction in the second glazing pane.

For n2=1.4 (index of ETFE) and n1=1.5 in the visible spectrum α2 is 210 and α1 33°. For n2=1.35 (index of FEP) and n1=1.5 in the visible spectrum α2 is 26° and α1 41°.

As diodes, the 4 mm-wide ALMD diodes from Avago may be chosen, 100% of the light flux emitted by each diode being in an emission cone between −30 and 30°. In particular, the red AlInGaP-based diodes referenced ALMD-EG3D-VX002, which have a dominant wavelength at 626 nm and a spectral width between 618 nm and 630 nm, may be chosen. In particular, the green InGaN-based diodes referenced ALMD-CM3D-XZ002, which have a dominant wavelength at 525 nm and a spectral width between 519 nm and 539 nm, may be chosen.

Each PCB carrier is a rectangular strip that does not project beyond the edge face of the glazing assembly 100 and comprises red and green LEDs in alternation. The maximum spacing between diodes of the same color is chosen to be 20 mm at most.

The diodes of the first source 4 (of the second source 4', respectively) each have a given main emission direction that is substantially parallel to the first edge face 13 (second edge face 13', respectively) for example to within 5°.

The normal luminance of an extracting feature on the first-face or second-face side with green or red light is about 100 cd/m$^2$ (+/−10 cd/m$^2$). The normal luminance is uniform (to +/−10 cd/m$^2$).

For the first light source 4, the electrical circuit of each "green" diode emitting in the green is adjusted so that the flux F1 emitted by this "green" diode is lower than 0.8 and even than 0.5 times the flux F2 emitted by a "red" diode emitting in the red.

For the second light source 4', the electrical circuit of each "green" diode emitting in the green is adjusted so that the flux emitted by this "green" diode is lower than 0.8 and even than 0.5 times the flux emitted by a "red" diode emitting in the red.

For example, for first and second PCB carriers 41, 41' of the same length, the following sequence may be repeated n times (n being higher than or equal to 1) on each of the carriers: two red diodes/one green diode, etc.

The first and second PCB carriers 41, 41' are located in the interior volume 74 of a mounting profile 7 of the glazing assembly which serves to frame the glazing assembly 100 or even fasten it to a wall. The glazing assembly may thus be a decorative panel fastened to a wall, a floor, a ceiling, etc.

The first face 12 is the display face of the two-color features.

Depending on its installation, the second face may also be a display face. Alternatively, the second face 12' may be covered with a specular reflector, such as a silvered layer (and a protective layer) and for example form a luminous mirror.

The mounting profile 7 is a preferably metal (aluminum, lacquered steel) or as a variant plastic (PVC, etc.) or even wooden profile of U-shaped cross section, comprising:

- a web 72 facing the edge face of the glazing assembly 100 (including the first and second edge faces 13, 13'; the edge faces of the low-index film and the first and second lamination interlayers 3, 3'), this preferably metal web here bearing the first and second PCB carriers 41, 41', which are adhesively bonded by a back-side adhesive 18', and for example serving to dissipate heat; and
- on either side of the web 72 first and second flanges 71, 73 that are preferably made of metal like the web (and therefore reflective) extending over the first face 12 and the second face 12', respectively, over a width W of 3 cm, said flanges being adhesively bonded to the faces 12, 12' for example with a transparent adhesive or a transparent double-sided adhesive 18 or a transparent double-sided adhesive tape such as the 0.5 mm version of the product Tesa ACX 7054 or the 0.2 mm-thick version of the product denoted D9605 from the company NITTO (polyester backing both faces of which are coated with an acrylic adhesive).

The first and second faces 12, 12' are free surfaces that are visible or even accessible (to the touch). The glazing assembly 2000 only comprises one laminated glazing unit comprising these two glazing panes, but, as a variant, another lamination interlayer, another low-index film, other extracting features and another glazing pane with emitting diodes of a color distinct from those already possible, may be added, on the same side as the second face 12', in order to add a third color.

The first and second edge faces 13, 13' are straight and polished. The opposite edge faces 14, 14' are straight, polished or even scattering.

For the sake of simplicity, the jamb of the U-shaped profile framing the laminated glazing unit has not been shown on the opposite-edge-face side 14, 14'.

Other diodes may be added to the edge face 14 opposite the first edge face 13, especially in the case of a glazing pane with a large first extracting area and/or with a plurality of spaced-apart centimeter-sized features.

Other diodes may be added to the edge face 14' opposite the second edge face 13', especially in the case of a glazing pane with a large second extracting area and/or with a plurality of spaced-apart centimeter-sized features.

The two luminous zones 50, 50' may be of any shape and extent, for the signal and/or decoration.

One of the luminous zones 50, 50' may comprise a thin feature, such as an arrow for example or even be closed or apertured (geometric outline, etc.).

The following FIGS. 1*a*, 1*b*, 1*c*, 1 *d*, 1*e* show front views of glazing assemblies with metal framing profiles taking the form of four jambs 7*a* to 7*d*. Examples of two-color luminous zones and the arrangement of first and second diode light sources are illustrated.

In FIG. 1*a*, the first extracting area may be a drawing 50 and the second a logo 50' under the drawing. The first and second diode assemblies 4, 4' are on the same longitudinal jamb (vertical after installation here) 7*a* or on two opposite jambs.

If it is a question of a store door the drawing may be replaced by the word "entrance" (in the desired language).

Considering the orthogonal projection of the second features onto the plane of the first features, the edge-to-edge distance Db between the first features and this projection may be freely chosen and is for example a few cm and even a few mm. The first features are said to be spaced apart by Db from the second features.

In FIG. 1*b*, the first and second extracting features 5, 5' form a chequerboard. There are no dark (non-luminous) zones between the first and second extracting areas 50, 50'. The first and second diode assemblies 4, 4' are on both the opposite longitudinal jambs 7*a*, 7*b* (which are vertical after installation here). Four light sources are therefore used.

This chequerboard pattern may be used in a decorative wall panel (chequerboard extending over the entire glazing area for example), but also in a door, a divider, etc.

In FIG. 1*c*, the first and second extracting features 5, 5' are round features that are spaced apart from each other by a freely chosen distance Db, a few cm for example. The first and second diode assemblies 4, 4' are on both the opposite longitudinal jambs 7*a*, 7*b* (which are vertical after installation here). Four light sources are therefore used.

These features 5, 5' may be used in a decorative wall panel (features extending over the entire glazing area for example), but also in a door, a divider, etc.

In FIG. 1*d*, the first and second extracting features 5, 5' form a luminous double frame. There are no dark (non-luminous) zones between the first and second extracting areas 50, 50'. The first and second diode assemblies 4, 4' are on the opposite longitudinal jambs 7*a*, 7*b* (which are horizontal after installation here). Four light sources are therefore used. Two others may be added to the lateral jambs 7*c*, 7*d*.

These features 5, 5' may thus be used in a decorative wall panel (features extending over the entire glazing area for example), but also in a door, a divider, a window, etc.

If it is desired to preserve an unobstructed glazing area preferably (in the central zone) the glazing assembly is preferably not adhesively bonded to an opaque wall and is transparent beyond the extracting areas. As a variant, an illuminating mirror is formed.

In FIG. 1e, the first and second extracting features 5, 5' each form an array of discrete features, for example disks of 1 mm diameter spaced apart by 4 mm, which features are adapted for an overall transparency (vision through the glazing assembly). The first and second diode assemblies 4, 4' are on the opposite longitudinal jambs 7a, 7b (which are horizontal after installation here). Four light sources are therefore used. Two others may be added to the lateral jambs 7c, 7d.

Figure 2A:
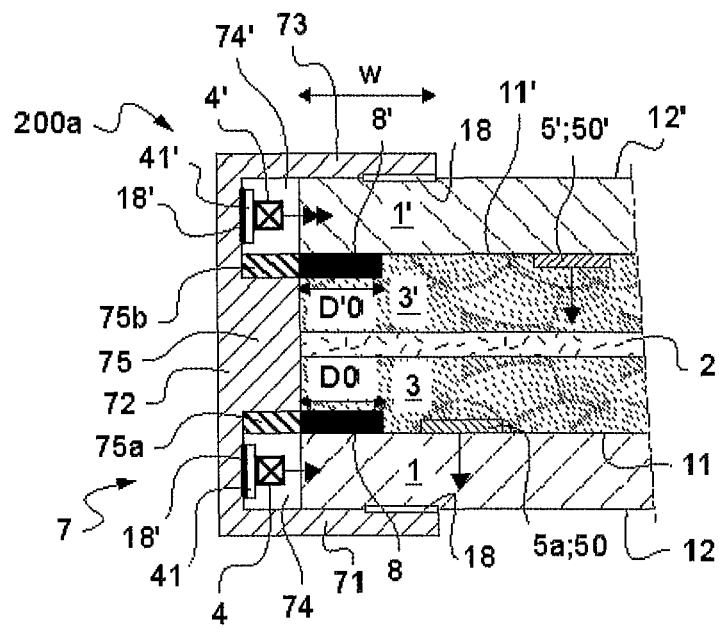

FIG. 2a shows a partial cross-sectional view of a luminous glazing assembly 200a in a second embodiment.

Only differences relative to the first embodiment are described. The luminous glazing assembly 200a differs as follows from the glazing assembly 100.

Conventional diodes 4, 4' without collimating optics—and even without (pre)encapsulation—having a large-angle emission pattern, for example a Lambertian emission pattern (for example with an angle at half-maximum of 120°) are chosen.

As diodes, the NSSM124T diodes sold by NICHIA of width WO equal to 3 mm may be chosen, arranged centered on the first edge face 13. As a precaution, it may also be chosen to retain the diodes of example 1.

To prevent mixing of the colors, a first so-called anti-mixing band 8, made of a black enamel or black paint, covers the internal face 11 over a width D0 in order to intersect the large-angle rays traveling toward the second glazing pane 1'. The first anti-mixing band 8 is upstream and spaced apart from the first extracting area 50 (the first extracting feature 5a), which is further from the first edge face 13.

D0 is at least equal to 0.8 Dmin where Dmin=d1/tan ($\pi$/2-arcsin(n2/n1)) and smaller than 2 cm and even 1 cm, d1 being the distance between the furthest edge of each diode 4 and the internal face 11. For d1 equal to 5 mm, n2=1.4 and n1=1.5. Dmin is therefore 13 mm.

Another identical first anti-mixing band (not shown) of the same width D01 may preferably be added to the first face 12 to intersect large-angle rays traveling toward the second glazing pane 1' after reflection from the flange 71. A single-sided or double-sided black adhesive tape is for example chosen in addition to (under the adhesive 18) or replacing the adhesive 18.

A second so-called anti-mixing band 8', made of a black enamel or black paint, covers the bonding face 11' over the width D'0 in order to intersect the large-angle rays traveling toward the first glazing pane 1. The second band 8' is spaced apart from the second extracting area 50, which is further away from the second edge face 13'.

D'0 is at least equal to 0.8 D'min where D'min=d'1/tan ($\pi$/2-arcsin(n2/n'1)) and smaller than 2 cm, d'1 being the distance between the furthest edge of each diode 41' of the second source 4' and the bonding face 11'. For d'1 equal to 5 mm, n'2=1.4 and n'1=1.5 D'min is therefore 13 mm.

Here the first and second bands are chosen to be identical. These anti-mixing bands are above all useful if n2 and n'2 are at least 1.2.

Another identical first anti-mixing band (not shown) of the same width D0 is preferably added to the second face 12' to intersect large-angle rays traveling toward the first glazing pane 1 after having been reflected from the flange 73.

Moreover, it is desirable to prevent any color mixing due to lateral leakage of light from the first diodes 4 in the internal volume 74 into the second glazing pane (rays not coupled to the first glazing pane) in particular refraction at the first interlayer or even at the second edge face, and/or due to lateral leakage of light from the second diodes 4' in the internal volume 74' into the first glazing pane (rays not coupled to the second glazing pane) in particular refraction at the second interlayer or even at the first edge face.

Thus, the carrier 7 is a profile having an E-shaped cross section rather than a U-shaped cross section, the central arm 75 of the E, which arm is preferably against or spaced apart by less than 1 mm from the (aligned) edge face of the laminated glazing assembly, being opaque and both acting as a partition and absorbing this light. The profile or at least this opaque central arm 75 is of a slightly smaller or equal thickness to the thickness of this central edge face between the internal face 11 and the bonding face 11'.

The profile 7 is of integral construction and for example made of metal. The arm 75 is made opaque (and non-reflective) by adding an opaque coating 75a, 75b such as a black adhesive band or a coat of black paint to the first lateral surface of the central arm 75 and to the second lateral surface of the central arm 75.

All of the profile 7 may be opaque (the profile having been submerged in a bath).

The first lateral surface with the opaque coating 75a preferably does not project toward or over the first edge face 13.

The second surface with the opaque coating 75b preferably does not project toward or over the second edge face 13'.

Preferably, an opaque coating of less than 1 mm and even less than 0.5 mm is chosen.

It is for example a black paint or a black adhesive, such as:
  single-sided: the product NORFIX T333 (polyethylene foam and acrylic adhesive) from Norton, thickness of 0.5 mm;
  double-sided: the product D5395B from Nitto, thickness of 0.05 mm (black polyester and acrylic adhesive) or D9625, thickness of 0.100 µm (black polyethylene and acrylic adhesive);
  single-sided: the product 61313B from Nitto, thickness of 0.05 mm (black polyester and acrylic adhesive); or
  double-sided: the product 521-12 µm from Lohmann, thickness of 12 µm.

There is no adhesive or any other fastening means between the central arm and the central edge face.

Black is preferred over white (such as the product NORFIX V1500 from Norton) for its greater opacity.

As a variant, the opaque (absorbent) central arm 75 is a separate part (with the aforementioned opaque coatings) that is added (fastened) to the web 72 by adhesive bonding, via a notch, etc.

As a variant mounting a second source 4' is placed on its carrier 41' and a second mixing band is placed facing the second edge face on an opposite (or adjacent) side of the insulating glazing unit. An identical E-shaped profile is then added (second partition formed by the opaque central arm of the E), which preferably forms part of a framing profile.

Figure 2B:
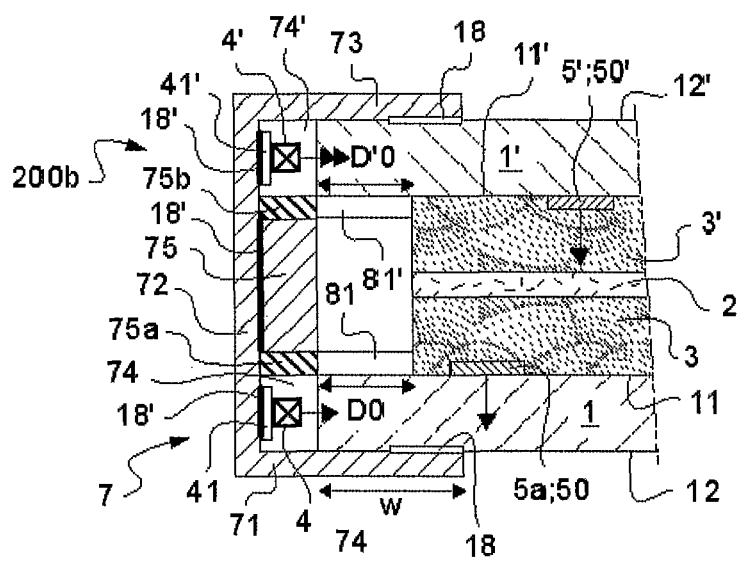

FIG. 2b shows a partial cross-sectional view of a luminous glazing assembly 200b in a first variant of the second embodiment.

Only differences relative to the second embodiment are described. The luminous glazing assembly 200b differs as follows from the glazing assembly 200a.

The first and second bands 81, 81' are each an opaque single-sided or double-sided adhesive band (adhesive tape) of thickness smaller than that of the interlayers (0.76 mm or even 0.38 mm)—for example bands such as those described above for the central arm 75 of the preceding example.

These adhesive bands 81, 81' have a free surface because the lamination interlayers 3, 3' and the first optical isolator 2 are recessed from the first and second edge faces 13, 13' and start from D0 or D'0.

The central arm 75 comprising the opaque coatings 75a, 75b is adhesively bonded to the web 72 and is spaced apart by less than 1 mm from the groove between the glazing panes 1, 1'. It may penetrate into the groove.

Figure 2C:
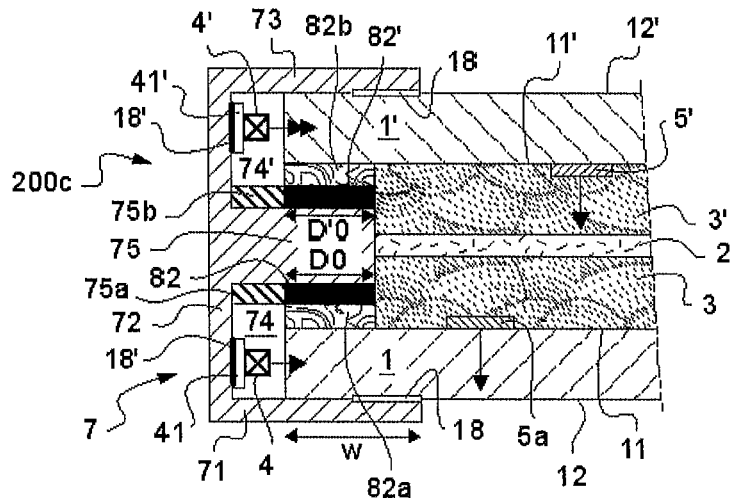

FIG. 2c shows a partial cross-sectional view of a luminous glazing assembly 200d in a second variant of the second embodiment.

Only differences relative to the first variant are described. The luminous glazing assembly 200d differs as follows from the glazing assembly 200b.

The first and second anti-mixing bands 82, 82' are each an opaque, preferably black, coating (ink etc.) on the main faces of the central arm 75, which penetrates between the glazing panes 1, 1' as far as the edge faces of the interlayers 3, 3' and of the optical isolator 2.

These opaque coatings 82, 82' have external surfaces that are adhesively bonded to the internal and bonding faces 11, 11' by an optical adhesive or a transparent double-sided adhesive 82a, 82b, such as a polyester carrier coated on both sides with an acrylic adhesive, such as the 0.2 mm-thick version of the product denoted D9605 from NITTO.

To form the opaque lateral surfaces 75a, 75b, the opaque coating 82, 82', chosen to be a black single-sided adhesive tape, may be extended.

It is even possible to omit the adhesive 82a and 82b and use a black two-sided adhesive tape for the anti-mixing bands 82 and 82' and the opaque coatings 75a and 75b on the lateral side surfaces 74 and 74'.

On the flanges 71 and 73, facing the lateral surfaces 75a and 75b, opaque internal walls may also be formed using a black adhesive.

Figure 2D:
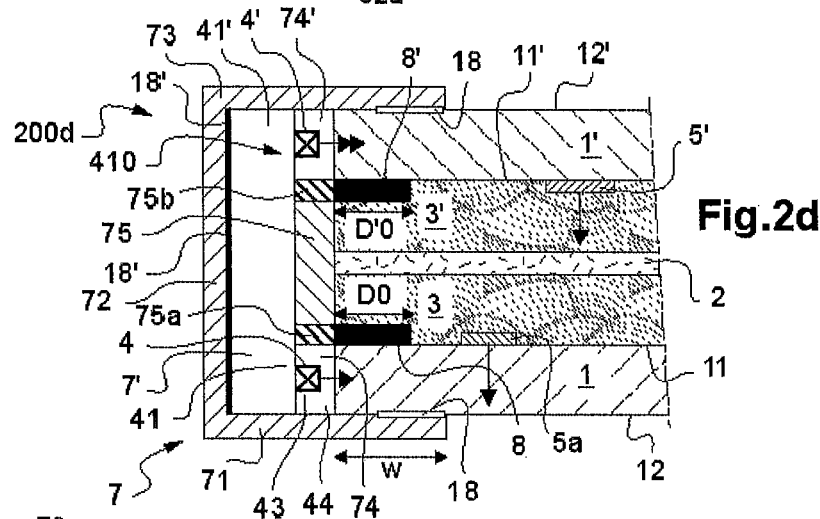

FIG. 2d shows a partial cross-sectional view of a luminous glazing assembly 200d in another variant of the second embodiment.

Only differences relative to the second embodiment are described. The luminous glazing assembly 200d differs as follows from the glazing assembly 200a.

A common PCB carrier 410 of width smaller than or equal to the thickness of the edge face of the glazing assembly facing the edge faces 13 and 13' bears the first and second diodes 4, 4'.

The common carrier 410 is adhesively bonded to the profile 7 by an adhesive 18'. The partition partitioning the light from the first and second diodes 4, 4' is a strip 75 comprising, on lateral surfaces, opaque coatings 75a and 75b. The strip is adhesively bonded to the common PCB carrier 410 or located in a notch, in either case protruding past the top-emitting diodes and against the central edge face between 13 and 13'.

Figure 2E:
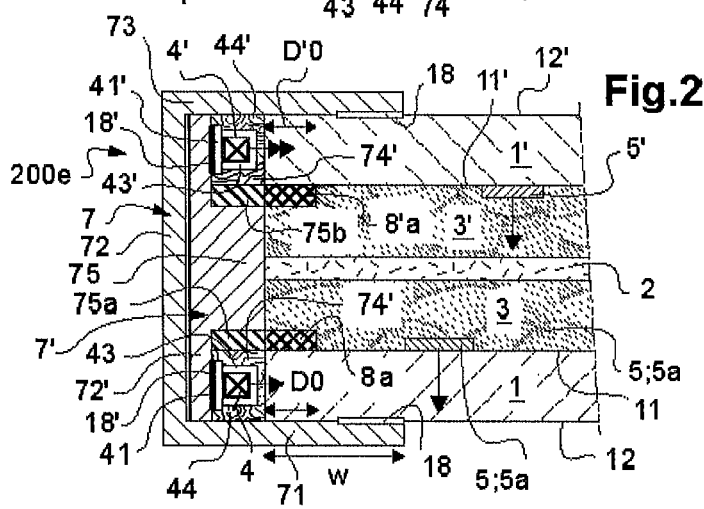

FIG. 2e shows a partial cross-sectional view of a luminous glazing assembly 200e in a variant of the second embodiment.

Only differences relative to the second embodiment are described. The luminous glazing assembly 200e differs as follows from the glazing assembly 200a.

Each of the diodes of the first source 4 (of the second source 4', respectively) comprises a primary encapsulation 43, 43' and is adhesively bonded to the first edge face 13 (to the second edge face 14', respectively) by an optical adhesive 44, 44' that does not project beyond the edge face of the glazing assembly toward the exterior.

Figure 2F:
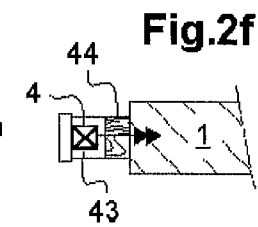

As a variant shown in FIG. 2f, the diodes are adhesively bonded by a transparent double-sided adhesive such as a polyester backing with acrylic adhesive on both its faces, such as the product denoted D9605 from NITTO, this adhesive for example not projecting beyond the edge face of the glazing assembly toward the exterior.

The first anti-mixing band 83 of width D0 is no longer an opaque coating but is replaced by a scattering band 8a (white enamel) that is thick (barely transparent) enough not to emit on the side opposite the internal face 11.

The second anti-mixing band 83' of width D'0 is no longer an opaque coating but is replaced by a second scattering band 8'a (white enamel) that is thick (barely transparent) enough not to emit on the side opposite the bonding face 11'.

The first and second PCB carriers 41, 41' are located on a common metal profile 7' that is T-shaped and not U-shaped and that therefore again has a central arm 75 comprising opaque lateral surfaces 75a, 75b (black adhesive tape, etc.) for partitioning the light sources 4, 4'. The profile 7' is of width smaller than or equal to the thickness of the edge face of the glazing assembly.

This profile 7' is premounted and is not fastened to the mounting profile 7 used for mounting the glazing assembly, which mounting profile 7 has a U-shaped cross section and comprises a web 72 and flanges 71, 73 that extend over the periphery of the first and second faces 12, 12' over a width W, and is adhesively bonded by a transparent double-sided adhesive 18, such as a polyester backing both faces of which are coated with an acrylic adhesive, such as the product denoted D9605 from NITTO.

FIG. 2'a shows a partial view of a variant of FIG. 2a in which another first anti-mixing band 8a of width D01 equal to D0, such as a black enamel deposit or a coat of black paint and preferably such as the first band 8, is added. The profile 7 is adhesively bonded by any type of adhesive above this zone 8a and/or by a transparent double-sided adhesive that may project toward the end of the flange 71 and/or be restricted to the zone 8a.

By way of precaution, facing the opaque lateral surface 75a a black adhesive tape 8b is added to the flange 71, on the same side as the internal space 74.

Likewise, on the second-glazing-pane side, another second anti-mixing band 8'a of width D02 equal to D'0, such as a black enamel deposit or a coat of black paint and preferably such as the second band 8', is added. The profile 7 is adhesively bonded by any type of adhesive above this zone 8'a and/or by a transparent double-sided adhesive that may project toward the end of the flange 73 and/or be restricted to the zone 8'a.

By way of precaution, facing the opaque lateral surface 75b a black adhesive tape 8'b is added to the flange 73, on the same side as the internal space 74'.

FIG. 2'b shows a partial view of a variant of FIG. 2a in which another first anti-mixing band 8a of width D01 equal to D0, such as a black double-sided adhesive tape, is added. The flange 71 projects beyond the other first anti-mixing band 8a. The adhesive 18 is no longer necessary.

By way of precaution, the black adhesive tape 8b is extended over the flange 71 on the same side as the internal space 74, facing the opaque lateral surface 75a.

Likewise, on the second-glazing-pane side, another second anti-mixing band 8'a of width D02 equal to D'0, such as a black double-sided adhesive tape, is added. The flange 73 projects beyond the other second anti-mixing band 8'a. The adhesive 18 is no longer necessary.

FIG. 3 shows a partial cross-sectional view of a luminous glazing assembly 300 in a third embodiment.

Only differences relative to the second embodiment 200*a* are described. The luminous glazing assembly 300 differs as follows from the glazing assembly 200*a*.

A low-index film is no longer used. A new glazing pane 1", which for example is identical to the first and second glazing panes 1, 1', is inserted. The thickness of each pane may be decreased to about 4 mm, d1 (d1') then being equal to 4 mm.

This new glass sheet 1" is coated:
- on its face 11", on the same side as the internal face 11, with a first low-index layer that is a layer of porous silica preferably obtained by the sol-gel process, which layer is 600 nm and better still 800 nm in thickness, said layer if necessary being surmounted with a first transparent protective coating 2*a* that is made up of a (dense) silica layer obtained by the sol-gel process, this protective layer being 300 nm or even larger in thickness and having a refractive index n4 of at least 1.4 at 550 nm; and
- on its face 12", on the same side as the bonding face 11', with a second low-index layer that is a layer of porous silica preferably obtained by the sol-gel process, which layer is 600 nm and better still 800 nm in thickness, said layer preferably being identical to the first low-index layer and, if necessary, surmounted with a second transparent protective coating 2'*a* that is made up of a (dense) silica layer obtained by the sol-gel process, this protective layer being 300 nm or even larger in thickness and preferably identical to the first protective coating 2*a*.

The mounting profile 7 is U-shaped (or as a variant preferably remains E-shaped in order to partition and absorb the light, or a part is added).

The index n2 of the first low-index layer (n'2 of the second low-index layer, respectively) varies as a function of the fraction of pores per unit volume and may easily range from 1.4 to 1.15. The fraction of pores per unit volume is preferably higher than 50% and even than 65% but is preferably lower than 85% in order to obtain a high layer withstand.

Each porous silica layer 2, 2' is a matrix of silica having closed pores (preferably bounded by walls made of the silica) in its volume.

The opaque partition 75 is a part adhesively bonded to the web 72 by an adhesive 18' and with on its lateral surfaces opaque coatings 75*a*, 75*b* (single-sided adhesive, coat of paint, etc.).

Another first anti-mixing band 8*a* of width D001 equal to D0, such as a black single-sided adhesive tape, is added to the first face 12. The flange 71 projects beyond the anti-mixing band and is adhesively bonded thereto by a transparent double-sided tape 18.

By way of precaution, the black adhesive tape 8*a* could be extended over the flange 71 on the same side as the internal space 74, facing the first opaque lateral surface 75*a*.

The same goes on the second-glazing-pane side. Another second anti-mixing band 8'*a* of width D02 equal to D'0, such as a black single-sided adhesive tape, is added. The flange 73 projects beyond the other second anti-mixing band and is adhesively bonded thereto by a transparent double-sided tape 18 or a transparent adhesive.

By way of precaution, the black adhesive tape 8'*a* could be extended over the flange 73 on the same side as the internal space 74', facing the second opaque lateral surface 75*b*.

As a variant, a black double-sided adhesive tape is used for the bands 8*a* and 8'*a* and the adhesive 18 is no longer necessary.

As a variant, the profile fits snugly and an adhesive 18 is not used.

If n2 drops below 1.2 (if n'2 drops below 1.2, respectively) the first (second, respectively) anti-mixing band 8, 8' and all the other anti-mixing bands 8*a*, 8'*a* may be removed.

The porosity may furthermore be monodisperse in size, the pore size then being calibrated. 80% or even more of the pores are closed and spherical (or oval) in shape, having a diameter between 75 nm and 100 nm.

As a variant, use may be made of only a glazing pane 1" comprising the first porous silica sol-gel layer 2 (preferably) with its protective coating 2*a*—the opposite face then making contact with the second lamination interlayer. However, given the millimeter-sized thickness of the central glazing pane 1" the path length traveled by the guided rays is increased and this may decrease the extraction efficiency.

An example procedure for manufacturing the porous silica layer is described in WO 2008/059170. Preferably, the high-temperature bake takes place after the wet deposition of the dense silica layer on the dried porous silica layer.

FIG. 4 shows a partial cross-sectional view of a luminous glazing assembly 400 in a fourth embodiment.

Only differences relative to the third embodiment 300 are described. The luminous glazing assembly 400 differs as follows from the glazing assembly 300.

The profile 7 is E-shaped and made of metal and for example has a thickness of at most 5 mm (this thickness being smaller than or equal to the bonding face-internal face distance), the profile 7 having a central arm 75 intermediate between the internal 11 and bonding 11' faces. The interlayers 3, 3', the low-index layers 2, 2' and their protective coatings 2*a*, 2*b* and the central glass sheet 1" are recessed from the first and second edge faces 13, 13' by D0 and D'0 (D'0 being equal to D0). On this central arm 75 the first PCB carrier 41 is arranged on one side, on the first lateral surface 75*a*, and the second PCB carrier 41' on the other side, on the second lateral surface 75*b*.

The diodes 4, 4' are side-emitting diodes. Each emitting face of the first source 4 (of the second source 4', respectively) is parallel to the first PCB carrier 41 (second PCB carrier 41', respectively).

The width of the emitting face is for example 1 mm and d1 is about 2.5 mm (for 4 mm-thick glass, the diodes being centered).

The PCB carriers 41, 41' may participate in the anti-mixing partitioning of the lights. Thus, the first PCB carrier 41 is opaque (or has an opaque coating on the side 74) and forms the first opaque partition 75'*a*, and the second PCB carrier 41' is opaque (or has an opaque coating on the side 74') and forms the second opaque partition 75'*b*.

Each PCB carrier is adhesively bonded to the surface of the central arm with an adhesive 18' that may be opaque.

Preferably the edge face of the first (second, respectively) PCB carrier does not face the first (second, respectively) edge face.

Alternatively, there is no recess, as in the example in FIG. 3. The PCB carriers 41, 41' (and the central arm 75 bearing them) are then against the central edge face.

By way of precaution, the black adhesive tape 8*a* could be extended over the flange 71 on the same side as the internal space 74 facing the first PCB 41. By way of precaution, the black adhesive tape 8'*a* could be extended over the flange 73 on the same side as the internal space 74' facing the second PCB 41'.

Alternatively, the PCB carriers 41, 41' are fastened to the flanges 71, 73 of the mounting profile 7.

FIG. 5*a* shows a partial cross-sectional view of a luminous glazing assembly 500*a* in a fifth embodiment.

Only differences relative to the second embodiment 200*a* are described. The luminous glazing assembly 500*a* differs as follows from the glazing assembly 200*a*.

The second diode light source 4' is on the opposite side of the glazing assembly to the first diode light source 4. The second edge face 13' is therefore on the opposite side of the glazing assembly to the first edge face 13. Likewise, the second anti-mixing band 8' is on the opposite side of the glazing assembly to the first anti-mixing band 8. The first and second glazing panes 1, 1' remain of identical size but are offset laterally thereby defining a first projecting zone 11*a* and a second projecting zone 11'*a*.

The profile 7' for fastening the PCB 41 to the first glazing pane 1 has a U-shaped cross section, is for example made of metal and is attached to the first glazing pane (in the projecting zone 11*a* of the internal face 11 due to the offset of the glazing panes).

Another profile 7'' for fastening the PCB 41' to the second glazing pane 1' is for example made of metal, has a U-shaped cross section and is attached to the second glazing pane 1' (in the second projecting zone 11'*a* of the bonding face 11' due to the offset of the glazing panes).

A profile for mounting the glazing assembly 7*a*, 7*b* is placed across the entire thickness of the glazing assembly, on each side enclosing the fastening profiles 7', 7''.

The first and second anti-mixing bands 8 and 8' are located in the projecting zones 11*a*, 11'*a*. Other anti-mixing bands 8*a*, 8'*a* of width D01 and D02 equal to D0 and D'0, respectively, are preferably added to the first and second faces 12, 12' facing the bands 8 and 8'. For example each anti-mixing band is a black double-sided adhesive tape for adhesively bonding the profile 7, 7' or is even single-sided.

Furthermore, it may be preferable for the flanges 71'' and 73'' to be opaque (internal walls with black deposit or black adhesive tape) in order to reinforce the anti-mixing effect.

In a first variant, the flanges 71' and 71'' are omitted and the profiles are L-shaped in cross section.

In a second variant shown in FIG. 5'*a*, which shows a partial view of the first-edge-face 13 side, the first PCB carrier is adhesively bonded with thermal adhesive to the web 72 of a U-shaped metal profile 7 fastened to the multiple glazing unit by its flanges 71, 73 (snug fit, adhesive, etc.).

The first anti-mixing band 8 has a free surface and for example is a black single-sided adhesive tape or a black deposit (enamel, etc.).

The other first anti-mixing band 8*a* is for example a black double-sided adhesive tape or a black deposit (enamel, etc.).

An internal opaque coating may be added (on the interior 74 side) to the flanges 71 and 73.

As a variant, if the web 72 is not made of metal a metal strip is inserted between the PCB 41 and the web.

On the second-edge-face side the same mounting is used.

FIG. 5*b* shows a partial cross-sectional view of a luminous glazing assembly 500*b* in a variant of the fifth embodiment.

Only differences relative to the fifth embodiment 500*a* are described. The luminous glazing assembly 500*b* differs as follows from the glazing assembly 500*a*.

The fastening profile 7' does not increase the thickness of the glazing assembly because it is located facing the projecting zone 11'*a* of the second glazing pane 1'. It is fastened via its flange 73' to this projecting zone (outside of the second extracting area 50'). The other profile 7'' also does not increase the thickness of the glazing assembly because it is located facing the projecting zone 11*a* of the first glazing pane 1'. It is fastened via its flange 73'' to this projecting zone (outside of the first extracting area 50).

The anti-mixing bands are optionally omitted.

The diodes then comprise a lens 42, 42' in order to obtain a narrow emission pattern. Alternatively a low-index layer (with a protective coating) with an n2 less than 1.2 is used as an optical isolator. Additional profiles 7*a* and 7*b* enclosing the profile 7' and 7'' are added.

FIG. 1' shows a partial cross-sectional view of a luminous glazing assembly 100' in a variant of the first embodiment.

Only differences relative to the first embodiment 100 are described. The luminous glazing assembly 100' differs as follows from the glazing assembly 100 in that a profile 7' for positioning the diodes 4 and 4' within the mounting profile 7 is used, for a divider application.

The mounting profile 7 is preferably made of metal (of aluminum or stainless steel) but may be made of a plastic, in particular a composite.

The profile 7 has a U-shaped body comprising a web 72 and two flanges 71 and 73 perpendicular to the web and parallel to and spaced apart from each other.

The first flange 71 of the mounting profile 7 is movable or removable, making the interior of the profile accessible at any moment, in particular subsequently to the installation of the partition.

The flange 71 may be movable or removable relative to or at the junction with the web 72, or indeed as illustrated at the distal end 71*a* of a fixed extension 72*a* projecting perpendicularly from the web 72.

The flange 71 is movable in that it pivots about a longitudinal axis along which the extension 71*a* extends, which axis forms an esthetically invisible hinge on the exterior of the profile. The flange pivots in the direction of the exterior of the profile 7, away from the first flange 71 (as shown by the arrow F1 in FIG. 1').

Removable sealing means 181 are provided placed against the first and second (exterior) faces 12, 12' and the respective flanges 71 and 73 of the mounting profile. These sealing means are for example fixed by clip fastening.

A profile called a positioning profile 7' of U-shaped cross section bearing the PCB carriers and the diodes 4, 4' is located in the interior volume 74*a* of the mounting profile. The flanges 71', 73' of this profile 7' are spaced apart from the flanges 71, 73 of the mounting profile.

The flanges 71' and 73' are fastened by a transparent double-sided adhesive tape 18 to the first and second exterior faces 12, 12'.

As a variant, by way of precaution:
  the lengths of transparent adhesive tape 18 are replaced by black enamel deposits (black enamel also being added to the bonding and internal faces) or by lengths of black double-sided adhesive tape;
  a common partition having opaque lateral surfaces such as described above is added, this partition being fastened to the web 72' and protruding relative to the diodes 4, 4';
  the PCB carriers are replaced by a common carrier (preferably bearing the opaque partition).

For the sake of simplicity, the jamb of the U-shaped profile 7 framing the laminated glazing unit has not been shown on the opposite-edge-face side 14, 14'.

Another similar internal profile and other diodes may be added to the edge face 14 opposite the first edge face 13, especially in the case of a glazing pane with a large first extracting area and/or with a plurality of spaced-apart centimeter-sized features.

Other diodes may be added to the other internal profile on the edge face 14' opposite the second edge face 13', especially in the case of a glazing pane with a large second extracting area and/or with a plurality of spaced-apart centimeter-sized features.

FIG. 1'a shows a partial view of a glazed door with bi-color features.

The glazing assembly comprises four first extracting areas 50a to 50d taking the form of rectangular horizontal bands the width (height) of which increases in the floor direction, for example at the instant t0 forming red luminous zones.

There are furthermore two second extracting areas 50'a, 50'b, for example at the instant t0 forming green luminous zones.

More precisely, one 50'a of the second extracting areas is a rectangular horizontal band between two first extracting areas 50a, 50b (as seen from in front). The third first extracting area 50c (starting from the top) flanks (as seen from in front) an assembly of characters taking the form of a logo forming the other of the second extracting areas 50'b.

There are transparent zones 17 between the extracting bands 50a to 50e and in the top and bottom portions.

The glazing assembly comprises a mounting frame 7a, 7b, 7c, 7d that is for example made of metal or plastic (PVC etc.) or even of wood (of integral construction or made up of a plurality of parts) and for example of U-shaped cross section. In the interior volume of the longitudinal and vertical mounting profile 7a on the first-edge-face side, an assembly 4 of red diodes is placed on a PCB carrier 41a facing the first edge face. In the interior volume of the longitudinal and vertical mounting profile 7b on the second-edge-face side, i.e. on the side opposite the first edge face, a second assembly 4' of green diodes is placed on a PCB carrier 41' facing the second edge face.

FIG. 1" shows a partial cross-sectional view of a luminous glazing assembly 100" in a variant of the second embodiment.

Only differences relative to the second embodiment 200a are described. The luminous glazing assembly 100" differs as follows from the glazing assembly 200a.

It is for example a question of a luminous glazed door of a piece of commercial refrigerating equipment. The multiple glazing unit is an insulating glazing unit. Furthermore, a third glazing pane 1" is added on the side of the second face 12' (which is no longer the most exterior face), said pane having third and fourth faces 11", 12" and a thickness equal to at least 3.8 mm (about 4 mm or 6 mm as standard), identical to those of the first and second glazing panes 1, 1', the third face being spaced apart from the second face 12' by a gas-filled cavity 60. On the periphery of the second and third faces 12', 11", a framing first polymer seal 6 and an insert 6' forming a spacer are located.

Usually, the insert 6' is fastened in the interior of the glazing unit by its lateral faces to the faces 12', 11" of the glazing panes 1', 1" by butyl rubber (not shown) which also has the role of rendering the interior of the insulating glazing unit leaktight to water vapor. The insert 6' is positioned recessed into the interior of the insulating glazing unit and close to the longitudinal edges of the edge faces of said glass sheets, so as to form a peripheral groove into which a black first polymer seal 6 is injected, this seal being a mastic, for instance a polysulfide or polyurethane mastic. The mastic 6 strengthens the mechanical assembly of the two glazing sheets 1', 1" and ensures leaktightness to liquid water or to solvents.

Another first anti-mixing band 8 is added on the side of the first (exterior) face 12, of width D001 equal to D0. It is a question of a thin black double-sided or single-sided adhesive tape such as those already described.

A metal profile 7' for positioning the diodes 4, 4' comprises:
  a portion called a bottom portion 72' facing the first and second edge faces 13, 13';
  a first lateral portion 71' (against or) adhesively bonded to the first exterior face 12 and increasing thickness by at most 1.5 mm and even at most 1 mm or even at most 0.5 mm in order not to increase by too much the distance between the framing profile 7 and the first glazing pane; and
  a second lateral portion or rim 71' (extension of the bottom portion) adhesively bonded to the first seal 6 with a double-sided adhesive tape 18a, this rim not making contact with the third glazing pane 1", in order not to create a thermal bridge, and being adjacent to and extending along the second edge face 13', said rim allowing the profile to be fastened to the edge face of the insulating glazing unit.

The first lateral portion 71' extends over the first face 12 over a width of D01 or even by as much as W (just like the exterior profile described below) there preferably being no opaque means beyond 001.

The seal 6 provides the function of the other second anti-mixing band of width D02 equal to D'0. As a variant, the butyl rubber forms a portion of the other second anti-mixing band in combination with the first seal.

The rim may also comprise an opaque coating on its internal surface (space 74' side) facing the second lateral surface 75b.

The third face 11" bears a low-E layer 17, such as a monosilver multilayer.

The fourth face 12" is the interior-side face of the piece of commercial refrigerating equipment. The first exterior face 12 is on the user side.

The first extracting feature 5, such as a white enamel or any other white scattering coating, is for example on the first face 12. The second extracting feature 5', such as a white enamel or any other white scattering coating, is for example on the second face 12'.

The glazed door 100" comprises the framing profile 7 fastened to the insulating glazing unit preferably by an opaque adhesive 180 called a mounting adhesive, said profile masking the first seal 6 and the insert 6'.

The framing jamb 7 is made up of two portions one of which is made of metal and the other of which is thermally insulating, in order to prevent any thermal bridging (case if all metal). A metal first portion contains a right angle and is for example a profile having an L-shaped cross section:
  with a first frontal portion 72a facing the edge face of the insulating glazing unit (first edge face 13 or even the second edge face without reaching as far as the third edge face 13", with the face on the side of the edge face of the glazing unit being adhesively bonded with an opaque adhesive 180; and
  with a first flange 71 adhesively bonded to the first exterior face by the opaque adhesive 180 above the first lateral portion 71' and projecting therebeyond (width W' above the first face 12 of between 1 cm and 3 cm).

The second portion of the profile 7 is thermally insulating, preferably made of a polymer, securely fastened with an adhesive 182 to the first portion, contains a right angle and has an L-shaped cross section:
- with a second frontal portion 72*b* facing the edge face of the insulating glazing unit (not extending as far as the first edge face 13) adhesively bonded to the first frontal portion of the metal first portion; and
- with a second flange 73 adhesively bonded to the second exterior face 12" (fourth face).

The profile for positioning the diodes is therefore in the interior volume of this profile 7.

The third edge face 13" projects beyond the first and second edge faces 13, 13' and is even flush with or projects beyond the back face of the positioning profile.

The lateral portions reflect the lateral light of the diodes in order to direct it toward the first and second injection edge faces 13, 13'.

The mounting adhesive 18 is absent from the space between the first edge face and the first light source 4, and between the second edge face and second light source 4' by virtue of the positioning profile 7.

The partition 75 partitioning the light from the first and second light sources is here separate from the positioning profile, and is adhesively bonded to the bottom part 72'.

Naturally, as a variant:
- it is possible as in FIG. 2*d* to use a common PCB and the partition is adhesively bonded to this PCB;
- and/or a second source 4' is placed on its carrier 41' and a second anti-mixing band is placed facing the second edge face on an opposite side of the insulating glazing unit. A second partition like the first and a framing and positioning profile such as those described are added.

As a variant, a luminous window may be formed with such an insulating glazing structure and light sources. The mounting profile (just like the positioning profile) may be modified.

FIG. 2" shows a partial cross-sectional view of a luminous glazing assembly 200" that is a door of a piece of refrigerating equipment in a variant of the preceding embodiment described in FIG. 1".

Only differences relative to the refrigerating equipment door 100" are described. The refrigerating equipment door 200" differs as follows from the refrigerating equipment door 100".

The positioning profile 7' is made of a plurality of securely fastened parts, because:
- the first lateral portion is an opaque sheet 71' such as a thin black single-sided adhesive tape as already described—one portion 71'*b* of which is adhesively bonded to the first exterior face 12 over the width D01 and one portion 71'*a* of which is adhesively bonded to the bottom part (to its back face);
- the bottom portion 72' is a strip of rectangular cross section;
- a separator 7'*a*, which is for example made of metal, is adhesively bonded to the bottom portion 72' and to the first seal 6.

The edge face 13" is here aligned with the other edge faces 13, 13'.

The separator may also comprise an opaque coating on its internal surface (space 74' side) facing the second lateral surface 75*b*.

As a variant, a profile of L-shaped cross section, for example an extrudate, forms the bottom portion with a thicker zone (the rim) adhesively bonded to the mastic 6.

As a variant, the first lateral portion 71' is an adhesively bonded metal sheet of 50 to 100 μm thickness—for example an aluminum sheet adhesively bonded by a black double-sided adhesive tape over the width D01.

FIG. 3" shows a partial cross-sectional view of a luminous glazing assembly 300" that is a door of a piece of refrigerating equipment in a variant of the embodiment described in FIG. 1".

Only differences relative to the refrigerating equipment door 100" are described. The refrigerating equipment door 300" differs as follows from the refrigerating equipment door 100".

The edge face 13" is here aligned with the first and second edge faces 13, 13'.

The positioning profile 7' is made of a plurality of securely fastened parts because the first lateral portion 71' is an opaque sheet such as a thin black single-sided adhesive tape such as already described—one portion 71'*b* of which is adhesively bonded to the first exterior face 12 over the width D01 and one portion 71'*a* of which is adhesively bonded to the bottom portion (to its back face).

The rim or fastening part 7'*a* is hollow and of rectangular (or square) cross section, the bottom portion 72' forming a lateral extension of this fastening part.

The second portion of the profile 7 does not extend as far as the second exterior face 12" (fourth face). For example, it is a question of an L-shaped profile against the third edge face 13".

An opaque, black or even white enamel 19 is added to the fourth face 12" in order to mask the first seal 6 and spacer 6'.

FIG. 1"*a* shows a schematic view of a piece of refrigerating equipment 1000 with the luminous refrigerating equipment door of the type already described in FIG. 1" but with diodes on two opposite sides of the insulating glazing unit.

This piece of refrigerating equipment is here a cabinet comprising shelves 1001 (dotted lines) and two doors each comprising a luminous insulating and laminated glazing unit comprising an exterior first main face 12 on the user side (visible here), an internal second main face (shelf side) and an edge made up of four edge faces. The longitudinal edge faces of the edge are vertical. The framing profile is a rectangular frame fastened to the periphery of the insulating glazing unit 1, 1", 1'". The frame comprises four jambs that abut at the corners of the insulating glazing unit. The two longitudinal jambs 7*a* and 7*b* are identical and vertical. Two lateral jambs 7*c* and 7*d* are horizontal. The first and second light sources 4, 4' (masked) are in the interior volume of the first longitudinal jamb 7*a* and in the interior volume of the second longitudinal jamb 7*b*, respectively.

Each door can be opened toward the exterior by virtue of a pivot 7*p* on the upper and lower jambs 7*c*, 7*d*.

The first features 5 (word, etc.) and the second features 5 (logo, etc.) are on either side of the visual location of a shelf.

Various static or dynamic two-color luminous zones are possible for differentiating products classed by type and/or promotion.

As shown in FIG. 1"*b* (front view of a refrigerating equipment door from the side of the first face 12), the first features 5, 50 form the image of the product and the second features 5', 50' the names of the type of products on the shelf ("ice cream", "sorbet" for example) on either side of the name.

As shown in FIG. 1"*c* (front view of a refrigerating equipment door from the side of the first face 12), the first features 5 form the image of the product and thereabove the second features 5', 50' the name of the type of product on the shelf ("drinks").

As shown in FIG. 1"d (front view of a refrigerating equipment door from the side of the first face 12), the first features 5, 50 form with the second features 5', 50' a two-color logo (an "M" interleaved with a "W").

As shown in FIG. 1"e (front view of a refrigerating equipment door from the side of the first face 12), the first features 5, 50 and the second features 5', 50' signal the promotions of the month.

The invention claimed is:

1. An illuminated assembly comprising:
    a multiple glazing unit, having a first exterior main face and a second exterior main face, including:
        a first light guide panel having an internal main face, a first main face, and a first edge face, the first light guide panel being made of a material having a refractive index n1;
        a second light guide panel having a bonding main face, a second main face, and a second edge face, the second light guide panel being optically coupled to the first light guide panel, with the bonding main face facing the internal main face;
    a first light source arranged to emit light of a first wavelength λ1 and optically coupled to the first light guide panel via the first edge face, said light of a first wavelength λ1 to be guided by the first light guide panel;
    a first light-extracting system associated with the first light guide panel, comprising one or more first extracting features defining a first extracting area, and configured to extract light of a first color C1 from the first light guide panel so that the extracted light of the first color C1 is visible from a side of the first exterior main face;
    a second light source arranged to emit light of a third wavelength λ3 and optically coupled to the second light guide panel via the second edge face, said light of a third wavelength λ3 to be guided by the second light guide panel, the third wavelength λ3 being different from the first wavelength λ1;
    a second light-extracting system associated with the second light guide panel, comprising one or more second extracting features defining a second extracting area, said one or more second features being offset from the one or more first extracting features, and configured to extract light of a third color C3 from the second light guide panel so that the extracted light of the third color C3 is visible from the side of the first exterior main face;
    a transparent first optical isolator disposed between the internal main face and the bonding main face and facing the internal main face, said transparent first optical isolator provided (a) between the first edge face and the first extracting area or (b) between the one or more first extracting features or both (a) between the first edge face and the first extracting area and (b) between the one or more first extracting features, the first optical isolator made of a material having a refractive index n2, such that n1-n2 is at least 0.08 at the wavelengths of the first light source;
wherein the transparent first optical isolator is laminated to the first light guide panel by a first lamination interlayer made of a first transparent polymer having a refractive index n3 such that, in absolute value, n3-n1 is lower than 0.05 at the wavelengths of the first light source; and
    a second lamination interlayer disposed between the main bonding face and the first optical isolator and made of a second transparent polymer having a refractive index n'3 such that, in absolute value, n'3-n'1 is lower than 0.05 at wavelengths of the second light source, said second lamination interlayer being in contact with the second light guide panel.

2. The illuminated assembly as claimed in claim 1, wherein the multiple glazing unit forms an insulating glazing unit and comprises a third panel having a third main face and a fourth main face, the second and third main faces being spaced apart by a first gas-filled cavity.

3. The illuminated assembly as claimed in claim 1, wherein the first light source comprises a first light-emitting diode configured to emit the light of wavelength λ1 and at least 80% of the light flux emitted by the first light-emitting diode is in an emission cone between $-\alpha 1$ and $\alpha 1$ where $\alpha 1 = \arcsin(n1 * \sin(\alpha 2))$ and where $\alpha 2 = (\pi/2) - \arcsin(n2/n1)$ corresponds to the angle of refraction in the first light guide panel, and wherein the second light source comprises a third light-emitting diode configured to emit the light of wavelength λ3 and at least 80% of the light flux emitted by the third light-emitting diode is in an emission cone between $-\alpha' 1$ and $\alpha' 1$ where $\alpha' 1 = \arcsin(n'1 * \sin(\alpha' 2))$ and where $\alpha' 2 = (\pi/2) - \arcsin(n'2/n'1)$ corresponds to the angle of refraction in the second light guide panel.

4. The illuminated assembly as claimed in claim 1, comprising:
    a partition, partially or completely preventing refraction of the light emitted by the first light source at an edge face of the multiple glazing unit between the internal main face and the second main face on the first-edge-face side;
    or when the first and second light sources are on the same side of the multiple glazing unit, a common partition, partially or completely preventing refraction of the light emitted by the first light source at the multiple-glazing-unit edge face between the internal main face and the second main face on the first-edge-face side and partially or completely preventing refraction of the light emitted by the second light source at the edge face between the bonding main face and the internal main face on the second-edge-face side.

5. The illuminated assembly as claimed in claim 1, wherein:
    at t0 the first light source comprises a green light-emitting diode that emits in the green with wavelength λ1 in a range extending from 515 nm to 535 nm, and the second light source comprises a red light-emitting diode that emits in the red with wavelength λ3 in a range extending from 615 nm to 635 nm, a flux F1 emitted by the green light-emitting diode is lower than 0.8 times a flux F3 emitted by the red light-emitting diode.

6. The illuminated assembly as claimed in claim 1, wherein the transparent first optical isolator comprises a first porous silica layer of thickness e2 of at least 400 nm on one main face of a third transparent panel that is made of mineral glass, said one main face being oriented to the internal-face side.

7. A product comprising the illuminated assembly as claimed in claim 1, wherein the product is a divider, tile, window, door, decorative panel and/or glazed door of a piece of commercial refrigerating equipment.

8. The illuminated assembly as claimed in claim 1, wherein a first anti-mixing band, which makes optical contact with the internal main face on a periphery of the internal main face, extends from the first edge face along the first edge face, said band being of width D0 at least equal to 0.8Dmin where $Dmin = d1/\tan((\pi/2) - \arcsin(n2/n1))$, where d1 is the distance between the first light source and the internal main face, the first anti-mixing band being opaque or a scattering first band with a transmission factor in the visible of at most 2% on a side of the internal main face, and wherein a second anti-mixing band, which makes optical contact with the bonding main face on a periphery of the bonding main face, extends from the second edge face, along the second edge face, said second anti-mixing band being of width D'0 at least equal to 0.8D'min where D'min=d' 1/tan (($\pi$/2)−arcsin(n'2/n1)), where d'1 is the distance between the second light source and the bonding main face, the second anti-mixing band being opaque or a scattering second band having a transmission factor in the visible of at most 2% on side of the bonding main face.

9. The illuminated assembly as claimed in claim 8, wherein the first and second light sources are on opposite sides of the multiple glazing unit, wherein the first light guide panel projects beyond the second light guide panel forming a first projecting region, wherein the first anti-mixing band is in the first projecting region on the internal main face, wherein the second light guide panel projects beyond the first light guide panel forming a second projecting region and the second anti-mixing band and wherein the second anti-mixing band is the second projecting region.

10. The illuminated assembly as claimed in claim 1, wherein the transparent first optical isolator comprises a first porous silica layer of thickness e2 of at least 400 nm.

11. The illuminated assembly as claimed in claim 10, wherein the first porous silica layer is coated with a first transparent and mineral protective coating.

12. The illuminated assembly as claimed in claim 1, wherein the first light source is switchable to emit, at a different instant, the instant, light at a second wavelength $\lambda 2$ distinct from the first wavelength $\lambda 1$.

13. The illuminated assembly as claimed in claim 12, wherein the light of the first wavelength $\lambda 1$ is emitted at instant t0 and the light of the second wavelength $\lambda 2$ is emitted at instant t' and wherein the first extracting system is such that the light extracted at said instant t' is of a second color C2 distinct from the first color C1.

14. The illuminated assembly as claimed in claim 1, wherein the transparent first optical isolator comprises a first low-index film made of a fluoropolymer-based material.

15. The illuminated assembly as claimed in claim 14, wherein each main surface of the first low-index film is treated with an adhesion-promoting treatment.

16. The illuminated assembly as claimed in claim 14, wherein the fluoropolymer is ETFE or FEP.

17. The illuminated assembly as claimed in claim 1, wherein the multiple glazing unit forms an insulating glazing unit comprising a third panel having a third main face and a fourth main face and a third edge face, the second and third faces being spaced apart by a first gas-filled cavity, a framing first polymer seal being placed on the periphery of the second and third main faces, wherein the first and second light sources are arranged on the same side of the multiple glazing unit, and wherein the illuminated assembly comprises a profile extending over the first exterior face, which is the first main face, or on a side of the first main face and facing the first and second edge faces, defining a volume containing the first and second light sources, and the profile comprises:
 a bottom portion facing the edge face of the multiple glazing unit which includes the first and second edge faces and a central edge face between the first and second edge faces;
 a first lateral portion against or adhesively bonded to the first exterior main face and increasing thickness by at most 1.5 mm; and
 either a portion forming a partition partitioning the light of the first and second light sources, which portion is fastened to or integral with the bottom portion and against the central edge face or spaced apart by at most 1 mm therefrom, or a partition partitioning the light of the first and second light sources, which partition is separate from the profile against the central edge face or spaced apart by at most 1 mm therefrom, the partition completely or partially preventing refraction of the light emitted by the first light source at the edge face between the internal main face and second main face and completely or partially preventing refraction of the light emitted by the second light source at the edge face between the bonding main face and first main face;
 and wherein a fastening part, adjacent to and extending along the second edge face, is fastened to the framing first polymer seal and securely fastened to or integral with the bottom portion.

18. The illuminated assembly as claimed in claim 17, wherein the fastening part is made of metal and does not make contact both with the second light guide panel and the third panel.

19. The luminous glazing illuminated assembly as claimed in claim 17, further comprising an additional profile comprising:
 a web facing the first and second edge faces, which web is against, adhesively bonded to or spaced apart from the bottom portion;
 a first flange fastened to the first exterior face;
 wherein the first flange is made of a first material, the web being made of said first material in a first zone facing the first and second light guide panels, and wherein the web is, in a second zone facing the third panel, made of a second material, the first material being securely fastened by adhesive bonding to the second material, one of the first and second materials being a metal the other being thermally insulating.

20. The illuminated assembly as claimed in claim 17, wherein the profile is internal to an additional profile for mounting the glazing assembly.

21. The illuminated assembly as claimed in claim 1, wherein the first light source is a first assembly of light-emitting diodes on a first printed circuit board (PCB) carrier and the light-emitting diodes are coupled to the first edge face, and the second light source is a second assembly of light-emitting diodes on a second printed circuit board (PCB) carrier, and the light-emitting diodes of the second light source are coupled to the second edge face, the first and second PCB carriers being spaced apart, contiguous or a common PCB carrier.

22. The illuminated assembly as claimed in claim 21, wherein the first assembly of light-emitting diodes and the second assembly of light-emitting diodes are arranged on the same side of the multiple glazing unit and are top-emitting diodes, and the first and/or second PCB carrier has a main face facing the first and second edge faces.

23. The illuminated assembly as claimed in claim 22, wherein the first and the second PCB carrier form a common PCB carrier that forms a common partition on the side of the first assembly and on the side of the second assembly, that lie substantially parallel to the multiple glazing unit, between the first assembly of light-emitting diodes and the second assembly of light-emitting diodes, the common partition completely or partially preventing refraction of the light emitted by the first assembly of diodes at the edge face between the internal main face and second main face and completely or partially preventing refraction of the light emitted by the second assembly of diodes at the edge face between the bonding main face and the first main face, the common partition protruding, relative to the first and second assemblies of light-emitting diodes, in the direction of the first and second edge faces.

* * * * *